US011466990B2

(12) United States Patent
Roumeliotis et al.

(10) Patent No.: US 11,466,990 B2
(45) Date of Patent: Oct. 11, 2022

(54) SQUARE-ROOT MULTI-STATE CONSTRAINT KALMAN FILTER FOR VISION-AIDED INERTIAL NAVIGATION SYSTEM

(71) Applicant: Regents of the University of Minnesota, Minneapolis, MN (US)

(72) Inventors: Stergios I. Roumeliotis, St Paul, MN (US); Kejian J. Wu, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 16/316,718

(22) PCT Filed: Jul. 21, 2017

(86) PCT No.: PCT/US2017/043280
§ 371 (c)(1),
(2) Date: Jan. 10, 2019

(87) PCT Pub. No.: WO2018/026544
PCT Pub. Date: Feb. 8, 2018

(65) Prior Publication Data
US 2019/0154449 A1    May 23, 2019

Related U.S. Application Data

(60) Provisional application No. 62/365,803, filed on Jul. 22, 2016.

(51) Int. Cl.
*G01C 21/16* (2006.01)
*G01S 5/16* (2006.01)
(Continued)

(52) U.S. Cl.
CPC .............. *G01C 21/165* (2013.01); *G01S 5/16* (2013.01); *G06F 17/16* (2013.01); *G06T 7/277* (2017.01);
(Continued)

(58) Field of Classification Search
USPC ........................................................ 701/472
See application file for complete search history.

(56) References Cited

U.S. PATENT DOCUMENTS

| | | | |
|---|---|---|---|
| 5,847,755 A | 12/1998 | Wixson et al. | |
| 6,104,861 A | 8/2000 | Tsukagoshi | |

(Continued)

FOREIGN PATENT DOCUMENTS

| | | |
|---|---|---|
| WO | WO2015013418 A2 | 1/2015 |
| WO | WO2015013534 A1 | 1/2015 |
| WO | 2018/026544 A1 | 2/2018 |

OTHER PUBLICATIONS

"Project Tango," retrieved from https://www.google.com/atap/projecttango on Nov. 2, 2015, 4 pp.
(Continued)

*Primary Examiner* — Tyler D Paige
(74) *Attorney, Agent, or Firm* — KPPB LLP

(57) ABSTRACT

A vision-aided inertial navigation system (VINS) implements a square-root multi-state constraint Kalman filter (SR-MSCKF) for navigation. In one example, a processor of a VINS receives image data and motion data for a plurality of poses of a frame of reference along a trajectory. The processor executes an Extended Kalman Filter (EKF)-based estimator to compute estimates for a position and orientation for each of the plurality of poses of the frame of reference along the trajectory. For features observed from multiple poses along the trajectory, the estimator computes constraints that geometrically relate the multiple poses of the
(Continued)

respective feature. Using the motion data and the computed constraints, the estimator computes state estimates for the position and orientation of the frame of reference. Further, the estimator determines uncertainty data for the state estimates and maintains the uncertainty data as a square root factor of a covariance matrix.

21 Claims, 4 Drawing Sheets

(51) Int. Cl.
  *G06T 7/277* (2017.01)
  *G06F 17/16* (2006.01)
  *G06T 7/70* (2017.01)
(52) U.S. Cl.
  CPC ...... *G06T 7/70* (2017.01); *G06T 2207/30241* (2013.01); *G06T 2207/30244* (2013.01)

(56) References Cited

U.S. PATENT DOCUMENTS

| | | | |
|---|---|---|---|
| 6,496,778 B1 | 12/2002 | Lin | |
| 7,015,831 B2 | 3/2006 | Karisson et al. | |
| 7,162,338 B2 | 1/2007 | Goncalves et al. | |
| 7,747,151 B2 | 6/2010 | Kochi et al. | |
| 7,991,576 B2 | 8/2011 | Roumeliotis | |
| 8,577,539 B1 | 11/2013 | Morrison et al. | |
| 8,965,682 B2 | 2/2015 | Tangirala et al. | |
| 8,996,311 B1 | 3/2015 | Morin et al. | |
| 9,026,263 B2* | 5/2015 | Hoshizaki | B60G 17/019 701/1 |
| 9,031,809 B1 | 5/2015 | Kumar et al. | |
| 9,243,916 B2 | 1/2016 | Roumeliotis et al. | |
| 9,227,361 B2 | 3/2016 | Fung et al. | |
| 9,303,999 B2 | 4/2016 | Hesch et al. | |
| 9,607,401 B2 | 3/2017 | Roumeliotis et al. | |
| 9,658,070 B2* | 5/2017 | Roumeliotis | G06V 20/56 |
| 9,709,404 B2 | 7/2017 | Roumeliotis et al. | |
| 9,766,074 B2 | 9/2017 | Roumeliotis et al. | |
| 9,996,941 B2 | 6/2018 | Roumeliotis et al. | |
| 10,012,504 B2 | 7/2018 | Roumeliotis et al. | |
| 10,203,209 B2 | 2/2019 | Roumeliotis et al. | |
| 10,254,118 B2 | 4/2019 | Roumeliotis et al. | |
| 10,339,708 B2 | 7/2019 | Lynen et al. | |
| 10,371,529 B2* | 8/2019 | Roumeliotis | G05D 1/027 |
| 10,670,404 B2 | 6/2020 | Roumeliotis et al. | |
| 2002/0198632 A1 | 12/2002 | Breed et al. | |
| 2003/0149528 A1 | 8/2003 | Lin | |
| 2004/0073360 A1 | 4/2004 | Foxlin | |
| 2004/0167667 A1 | 8/2004 | Goncalves et al. | |
| 2005/0013583 A1 | 1/2005 | Itoh | |
| 2007/0038374 A1* | 2/2007 | Belenkii | G01C 21/025 701/4 |
| 2008/0167814 A1 | 7/2008 | Samarasekera et al. | |
| 2008/0265097 A1 | 10/2008 | Stecko et al. | |
| 2008/0279421 A1 | 11/2008 | Hamza et al. | |
| 2009/0212995 A1* | 8/2009 | Wu | G01S 5/0289 342/458 |
| 2009/0248304 A1 | 10/2009 | Roumeliotis et al. | |
| 2010/0110187 A1 | 5/2010 | von Flotow et al. | |
| 2010/0211316 A1 | 8/2010 | Da Silva et al. | |
| 2010/0220176 A1 | 9/2010 | Ziemeck et al. | |
| 2011/0238307 A1 | 9/2011 | Psiaki et al. | |
| 2012/0121161 A1 | 5/2012 | Eade | |
| 2012/0194517 A1 | 8/2012 | Izadi et al. | |
| 2012/0203455 A1* | 8/2012 | Louis | G01C 21/005 701/505 |
| 2013/0138264 A1* | 5/2013 | Hoshizaki | G01C 21/12 701/1 |
| 2013/0335562 A1 | 12/2013 | Ramanandan et al. | |
| 2014/0333741 A1 | 11/2014 | Roumeliotis et al. | |
| 2014/0372026 A1* | 12/2014 | Georgy | G01S 19/47 701/469 |
| 2015/0219767 A1* | 8/2015 | Humphreys | G01S 19/54 342/357.26 |
| 2015/0356357 A1 | 12/2015 | McManus et al. | |
| 2016/0161260 A1* | 6/2016 | Mourikis | G01C 21/165 701/500 |
| 2016/0364990 A1* | 12/2016 | Khaghani | G05D 1/0088 |
| 2017/0176189 A1 | 6/2017 | D'Aquila | |
| 2017/0336511 A1* | 11/2017 | Nerurkar | G06T 7/55 |
| 2018/0023953 A1 | 1/2018 | Roumelitotis et al. | |
| 2018/0082137 A1 | 3/2018 | Melvin et al. | |
| 2018/0211137 A1* | 7/2018 | Hesch | G06K 9/6232 |
| 2018/0259341 A1 | 9/2018 | Aboutalib et al. | |
| 2018/0328735 A1 | 11/2018 | Roumelitotis et al. | |
| 2019/0178646 A1 | 6/2019 | Roumelitotis et al. | |
| 2019/0392630 A1 | 12/2019 | Sturm et al. | |
| 2021/0004979 A1 | 1/2021 | Valentin et al. | |

OTHER PUBLICATIONS

Agarwal et al., "A Survey of Geodetic Approaches to Mapping and the Relationship to Graph-Based SLAM," IEEE Robotics and Automation Magazine, vol. 31, Sep. 2014, 17 pp.

Ait-Aider et al., "Simultaneous object pose and velocity computation using a single view from a rolling shutter camera," Proceedings of the IEEE European Conference on Computer Vision, May 7-13, 2006, pp. 56-68.

Ayache et al., "Maintaining Representations of the Environment of a Mobile Robot," IEEE Transactions on Robotics and Automation, vol. 5, No. 6, Dec. 1989, pp. 804-819.

Bailey et al., "Simultaneous Localisation and Mapping (SLAM): Part II State of the Art," IEEE Robotics and Automation Magazine, vol. 13, No. 3, Sep. 2006, 10 pp.

Baker et al., "Removing rolling shutter wobble," Proceedings of the IEEE Conference on Computer Vision and Pattern Recognition, Jun. 13-18, 2010, 8 pp.

Bar-Shalom et al., "Estimation with Applications to Tracking and Navigation," Chapter 7, Estimation with Applications to Tracking and Navigation, ISBN 0-471-41655-X, Jul. 2001, 20 pp.

Bartoli et al., "Structure from Motion Using Lines: Representation, Triangulation and Bundle Adjustment," Computer Vision and Image Understanding, vol. 100, Aug. 11, 2005, pp. 416-441.

Bayard et al., "An Estimation Algorithm for Vision-Based Exploration of Small Bodies in Space," 2005 American Control Conference, Jun. 8-10, 2005, pp. 4589-4595.

Bierman, "Factorization Methods for Discrete Sequential Estimation," Mathematics in Science and Engineering, Academic Press, vol. 128, 1977, 259 pp. (Applicant points out, in accordance with MPEP 609.04(a), that the year of publication, 1977, is sufficiently earlier than the effective U.S. filing date, so that the particular month of publication is not in issue.).

Bloesch et al., "Iterated Extended Kalman Filter Based Visual-Inertial Odometry Using Direct Photometric Feedback," International Journal of Robotics Research, vol. 36, No. 10, Sep. 2017, 19 pp.

Bloesch et al., "Robust Visual Inertial Odometry Using a Direct EKF-Based Approach," Proceeding of the IEEE/RSJ International Conference on Intelligent Robots and Systems, Sep. 2015, 7 pp.

Bouguet, "Camera Calibration Toolbox for Matlab," retrieved from http://www.vision.caltech.edu/bouguetj/calib_doc/., Oct. 14, 2015, 5 pp.

Boyd et al., "Convex Optimization," Cambridge University Press, 2004, 730 pp. (Applicant points out, in accordance with MPEP 609.04(a), that the year of publication, 2004, is sufficiently earlier than the effective U.S. filing date so that the particular month of publication is not in issue.).

Breckenridge, "Interoffice Memorandum to T. K. Brown, Quaternions—Proposed Standard Conventions," IOM 343-79-1199, Oct. 31, 1979, 12 pp.

Burri et al., "The EuRoC Micro Aerial Vehicle Datasets," International Journal of Robotics Research, vol. 35, No. 10, Sep. 2016, 9 pp.

(56) References Cited

OTHER PUBLICATIONS

Canny, "A Computational Approach to Edge Detection," IEEE Transactions on Pattern Analysis and Machine Intelligence, vol. 8, No. 6, Nov. 1986, pp. 679-698.
Chauhan et al., "Femoral Artery Pressures Are More Reliable Than Radial Artery Pressures on Initiation of Cardiopulmonary Bypass," Journal of Cardiothoracic and Vascular Anesthesia, vol. 14, No. 3, Jun. 2000, 3 pp.
Chen et al., "Local Observability Matrix and its Application to Observability Analyses," Proceedings of the 16th Annual Conference IEEE Industrial Electronics Society, Nov. 1990, 4 pp.
Chen, "Pose Determination from Line-to-Plane Correspondences: Existence Condition and Closed-Form Solutions," Proc. 3rd. Int. Coni. Comp. Vision, Dec. 4-7, 1990, pp. 374-378.
Chiu et al., "Robust vision-aided navigation using sliding-window factor graphs," 2013 IEEE International Conference on Robotics and Automation, May 6-10, 2013, pp. 46-53.
Chiuso et al., "Structure from Motion Causally Integrated Over Time," IEEE Transactions on Pattern Analysis and Machine Intelligence, vol. 24, No. 4, Apr. 2002, pp. 523-535.
Davison et al., "Simultaneous Localisation and Map-Building Using Active Vision," Jun. 2001, 18 pp.
Deans., "Maximally Informative Statistics for Localization and Mapping", Proceedings of the 2002 IEEE International Conference on Robotics & Automation, (Washington, D.C.), May 2002, 1824-1829.
Dellaert et al., "Square Root SAM: Simultaneous Localization and Mapping via Square Root Information Smoothing," International Journal of Robotics and Research, vol. 25, No. 12, Dec. 2006, pp. 1181-1203.
Diel, "Stochastic Constraints for Vision-Aided Inertial Navigation," Massachusetts Institute of Technology, Department of Mechanical Engineering, Master Thesis, Jan. 2005, 106 pp.
Dong-Si et al., "Motion Tracking with Fixed-lag Smoothing: Algorithm and Consistency Analysis," Proceedings of the IEEE International Conference on Robotics and Automation, May 9-13, 2011, 8 pp.
Durrant-Whyte et al., "Simultaneous Localisation and Mapping (SLAM): Part I the Essential Algorithms," IEEE Robotics and Automation Magazine, vol. 13, No. 2, Jun. 2006, 9 pp.
DuToit et al., "Consistent Map-based 3D Localization on Mobile Devices," Proceedings of the IEEE International Conference on robotics and Automation, May 2017, 8 pp.
Eade et al., "Scalable Monocular SLAM," Proceedings of the 2006 IEEE Computer Society Conference on Computer Vision and Pattern Recognition (CVPR '06), vol. 1, Jun. 17-22, 2006, 8 pp.
Engel et al., "Direct Sparse Odornetry," IEEE Transactions on Pattern Analysis and Machine Intelligence, vol. 40, No. 3, Mar. 2018, 15 pp.
Engel et al., "LSD-SLAM: Large-Scale Direct Monocular SLAM," Proceedings of the European Conference on Computer Vision, Sep. 2014, 16 pp.
Engel et al., "Semi-Dense Visual Odometry for a Monocular Camera," Proceedings of the IEEE International Conference on Computer Vision, Dec. 2013, 8 pp.
Erdogan et al., "Planar Segmentation of RGBD Images Using Fast Linear Filling and Markov Chain Monte Carlo," Proceedings of the IEEE International Conference on Computer and Robot Vision, May 27-30, 2012, pp. 32-39.
Eustice et al., "Exactly Sparse Delayed-slate Filters for View-based SLAM," IEEE Transactions on Robotics, vol. 22 (6), Dec. 2006, pp. 1100-1114.
Eustice et al., "Visually Navigating the RMS Titanic With SLAM Information Filters," Proceedings of Robotics Science and Systems, Jun. 2005, 9 pp.
Forster et al., "IMU Preintegration on Manifold for Efficient Visual-Inertial Maximum-a-posteriori Estimation," Proceedings of Robotics: Science and Systems, Jul. 2015, 10 pp.
Forster et al., "SVO: Semi-Direct Visual Odometry for Monocular and Multi-Camera Systems," IEEE Transactions on Robotics, vol. 33, No. 2, Apr. 2017, 18 pp.
Furgale et al., "Unified temporal and spatial calibration for multi-sensor systems," Proceedings of the IEEE/RSJ International Conference on Intelligent Robots and Systems, Nov. 3-7, 2013, pp. 1280-1286.
Garcia et al., "Augmented State Kalman Filtering for AUV Navigation." Proceedings of the 2002 IEEE International Conference on Robotics & Automation, May 2002, 6 pp.
Golub et al., "Matrix Computations, Third Edition," The Johns Hopkins University Press, 2012, 723 pp. (Applicant points out, in accordance with MPEP 609.04(a), that the year of publication, 2012, is sufficiently earlier than the effective U.S. filing date, so that the particular month of publication is not in issue.).
Golub et al., "Matrix Computations, Fourth Edition," The Johns Hopkins University Press, 2013, 780 pp. (Applicant points out, in accordance with MPEP 609.04(a), that the year of publication, 2013, is sufficiently earlier than the effective U.S. filing date, so that the particular month of publication is not in issue.).
Golub et al., "Matrix Multiplication Problems," Chapter 1, Matrix Computations, Third Edition, ISBN 0-8018-5413-X, 1996. (Applicant points out, in accordance with MPEP 609.04(a), that the year of publication, 1996, is sufficiently earlier than the effective U.S. filing date, so that the particular month of publication is not in issue.).
Guivant et al., "Optimization of the Simultaneous Localization and Map-Building Algorithm for Real-Time Implementation," IEEE Transactions on Robotics and Automation, vol. 17, No. 3, Jun. 2001, 16 pp.
Guo et al., "An Analytical Least-Squares Solution to the Odometer-Camera Extrinsic Calibration Problem," Proceedings of the IEEE International Conference on Robotics and Automation, May 2012, 7 pp.
Guo et al., "Efficient Visual-Inertial Navigation using a Rolling-Shutter Camera with Inaccurate Timestamps," Proceedings of Robotics: Science and Systems, Jul. 2014, 9 pp.
Guo et al., "IMU-RGBD Camera 3D Pose Estimation and Extrinsic Calibration: Observability Analysis and Consistency Improvement," Proceedings of the IEEE International Conference on Robotics and Automation, May 6-10, 2013, pp. 2935-2942.
Guo et al., "Observability-constrained EKF Implementation of the IMU-RGBD Camera Navigation Using Point and Plane Features," Technical Report. University of Minnesota, Mar. 2013, 6 pp.
Guo et al., "Resource-Aware Large-Scale Cooperative 3D Mapping from Multiple Cell Phones," Multiple Autonomous Robotic Systems (MARS) Lab, ICRA Poster May 26-31, 2015, 1 pp.
Harris et al., "A combined corner and edge detector," Proceedings of the Alvey Vision Conference, Aug. 31-Sep. 2, 1988, pp. 147-151.
Hermann et al., "Nonlinear Controllability and Observability," IEEE Transactions on Automatic Control, vol. 22, No. 5, Oct. 1977, pp. 728-740.
Herrera et al., "Joint Depth and Color Camera Calibration with Distortion Correction," IEEE Trans. On Pattern Analysis and Machine Intelligence, vol. 34(10), Oct. 2012, pp. 2058-2064.
Hesch et al., "Consistency analysis and improvement of vision-aided inertial navigation," IEEE Transactions on Robotics, vol. 30, No. 1, Feb. 2014, pp. 158-176.
Hesch et al., "Observability-constrained Vision-aided Inertial Navigation," University of Minnesota, Department of Computer Science and Engineering, MARS Lab, Feb. 2012, 24 pp.
Hesch et al., "Towards Consistent Vision-aided Inertial Navigation," Proceedings of the 10th International Workshop on the Algorithmic Foundations of Robotics, Jun. 13-15, 2012, 16 pp.
Higham, "Matrix Inversion," Chapter 14, Accuracy and Stability of Numerical Algorithms, Second Edition, ISBN 0-89871-521-0, 2002, 29 pp. (Applicant points out, in accordance with MPEP 609.04(a), that the year of publication, 2002, is sufficiently earlier than the effective U.S. filing date, so that the particular month of publication is not in issue.).
Horn, "Closed-form solution of absolute orientation using unit quaternions," Journal of the Optical Society of America A, vol. 4, Apr. 1987, 14 pp.

(56) References Cited

OTHER PUBLICATIONS

Horn et al., "Closed-form solution of absolute orientation using orthonormal matrices," Journal of the Optical Society of America A, vol. 5, No. 7, Jul. 1988, pp. 1127-1135.
Huang et al., "Observability-based rules for designing consistent EKF slam estimators," International Journal of Robotics Research, vol. 29, No. 5, Apr. 2010, pp. 502-528.
Huang et al., "Visual Odometry and Mapping for Autonomous Flight Using an RGB-D Camera," Proceedings of the International Symposium on Robotics Research, Aug. 28-Sep. 1, 2011, 16 pp.
Huster, "Relative Position Sensing by Fusing Monocular Vision and Inertial Rate Sensors," Stanford University, Department of Electrical Engineering, Dissertation, Jul. 2003, 158 pp.
Jia et al., "Probabilistic 3-D motion estimation for rolling shutter video rectification from visual and inertial measurements," Proceedings of the IEEE International Workshop on Multimedia Signal Processing, Sep. 2012, pp. 203-208.
Johannsson et al., "Temporally Scalable Visual Slam Using a Reduced Pose Graph," in Proceedings of the IEEE International Conference on Robotics and Automation, May 6-10, 2013, 8 pp.
Jones et al., "Visual-inertial Navigation, Mapping and Localization: A Scalable Real-time Causal Approach," International Journal of Robotics Research, vol. 30, No. 4, Mar. 31, 2011, pp. 407-430.
Julier, "A Sparse weight Kalman Filter Approach to Simultaneous Localisation and Map Building," Proceedings of the IEEE/RSJ International Conference on Intelligent robots and Systems, vol. 3, Oct. 2001, 6 pp.
Julier et al., "A Non-divergent Estimation Algorithm in the Presence of Unknown Correlations," Proceedings of the American Control Conference, vol. 4, Jun. 1997, 5 pp.
Kaess et al., "iSAM: Incremental Smoothing and Mapping," IEEE Transactions on Robotics, Manuscript, Sep. 7, 2008, 14 pp.
Kaess et al., "iSAM2: Incremental Smoothing and Mapping Using the Bayes Tree," International Journal of Robotics Research, vol. 31, No. 2, Feb. 2012, pp. 216-235.
"Kalman filter," Wikipedia, the Free Encyclopedia, accessed from https://en.wikipedia.org/w/index.php?title=Kalman_filter&oldid=730505034, Jul. 19, 2016, 30 pp.
Kelly et al., "A general framework for temporal calibration of multiple proprioceptive and exteroceptive sensors," Proceedings of International Symposium on Experimental Robotics, Dec. 18-21, 2010, 15 pp.
Kelly et al., "Visual-inertial sensor fusion: Localization, mapping and sensor-to-sensor self-calibration," International Journal of Robotics Research, vol. 30, No. 1, Jan. 2011, pp. 56-79.
Klein et al., "Parallel Tracking and Mapping for Small AR Workspaces," Proceedings of the IEEE and ACM International Symposium on Mixed and Augmented Reality, Nov. 13-16, 2007, pp. 225-234.
Kneip et al., "Robust Real-Time Visual Odometry with a Single Camera and an IMU," Proceedings of the British Machine Vision Conference, Aug. 29-Sep. 2, 2011, pp. 16.1-16.11.
Konolige et al., "Efficient Sparse Pose Adjustment for 2D Mapping," Proceedings of the IEEE/RSJ International Conference on Intelligent Robots and Systems, Oct. 18-22, 2010, pp. 22-29.
Konolige et al., "FrameSLAM: From Bundle Adjustment to Real-Time Visual Mapping," IEEE Transactions on Robotics, vol. 24, No. 5, Oct. 2008, pp. 1066-1077.
Konolige et al., "View-based Maps," International Journal of Robotics Research, vol. 29, No. 8, Jul. 2010, 14 pp.
Kottas et al., "A Resource-aware Vision-aided Inertial Navigation System for Wearable and Portable Computers," IEEE International Conference on Robotics and Automation, Accepted Apr. 18, 2014, available online May 6, 2014, 3 pp.
Kottas et al., "An Iterative Kalman Smoother for Robust 3D Localization on Mobile and Wearable devices," Submitted confidentially to International Conference on Robotics & Automation, ICRA '15, May 5, 2015, 8 pp.
Kottas et al., "An iterative Kalman smoother for robust 3D localization on mobile and wearable devices," Proceedings of the IEEE International Conference on Robotics and Automation, May 26-30, 2015, pp. 6336-6343.
Kottas et al., "An Iterative Kalman Smoother for Robust 3D Localization and mapping," ISRR, Tech Report, Oct. 16, 2014, 15 pp.
Kottas et al., "Detecting and dealing with hovering maneuvers in vision-aided inertial navigation systems," Proceedings of the IEEE/RSJ International Conference on Intelligent Robots and Systems, Nov. 3-7, 2013, pp. 3172-3179.
Kottas et al., "Efficient and Consistent Vision-aided Inertial Navigation using Line Observations," Department of Computer Science & Engineering, University of Minnesota, MARS Lab, TR-2012-002, Sep. 2012, 14 pp.
Kottas et al., "On the Consistency of Vision-aided Inertial Navigation," Proceedings of the International Symposium on Experimental Robotics, Jun. 17-20, 2012, 15 pp.
Kummerle et al., "g2o: A General Framework for Graph Optimization," in Proceedings of the IEEE International Conference on Robotics and Automation, May 9-13, 2011, pp. 3607-3613.
Langelaan, "State Estimation for Autonomous Flight in Cluttered Environments," Stanford University, Department of Aeronautics and Astronautics, Dissertation, Mar. 2006, 128 pp.
Latif et al., "Applying Sparse $\ell_1$-Optimization to Problems in Robotics," ICRA 2014 Workshop on Long Term Autonomy, Jun. 2014, 3 pp.
Lee et al., "Pose Graph-Based RGB-D SLAM in Low Dynamic Environments," ICRA Workshop on Long Term Autonomy, 2014, 19 pp. (Applicant points out, in accordance with MPEP 609.04(a), that the year of publication, 2014, is sufficiently earlier than the effective U.S. filing date so that the particular month of publication is not in issue.).
Leutenegger et al., "Keyframe-based visual-inertial odometry using nonlinear optimization," The International Journal of Robotics Research, vol. 34, No. 3, Mar. 2015, pp. 314-334.
Li et al., "3-D Motion Estimation and Online Temporal Calibration for Camera-IMU Systems," Proceedings of the IEEE International Conference on Robotics and Automation, May 6-10, 2013, pp. 5709-5716.
Li et al., "High-Precision, Consistent EKF-based Visual-Inertial Odometry," International Journal of Robotics Research, vol. 32, No. 6, May 2013, 33 pp.
Li et al., "Improving the Accuracy of EKF-based Visual-Inertial Odometry," 2012 IEEE International Conference on Robotics and Automation, May 14-18, 2012, pp. 828-835.
Li et al., "Optimization-Based Estimator Design for Vision-Aided Inertial Navigation," Proceedings of the Robotics: Science and Systems Conference, Jul. 9-13, 2012, 8 pp.
Li et al., "Real-time Motion Tracking on a Cellphone using Inertial Sensing and a Rolling-Shutter Camera," 2013 IEEE International Conference on Robotics and Automation (ICRA), May 6-10, 2013, 8 pp.
Li et al., "Vision-aided inertial navigation with rolling-shutter cameras," The International Journal of Robotics Research, retrieved from ijr.sagepub.com on May 22, 2015, 18 pp.
Lim et al., "Zero-Configuration Indoor Localization over IEEE 802.11 Wireless Infrastructure," Jun. 23, 2008, 31 pp.
Liu et al., "Estimation of Rigid Body Motion Using Straight Line Correspondences," Computer Vision, Graphics, and Image Processing, vol. 43, No. 1, Jul. 1988, pp. 37-52.
Liu et al., "ICE-BA: Incremental, Consistent and Efficient Bundle Adjustment for Visual-Inertial SLAM," Proceedings of the IEEE Conference on Computer Vision and Pattern Recognition, Jun. 2018, 9 pp.
Liu et al., "Multi-aided Inertial Navigation for Ground Vehicles in Outdoor Uneven Environments," Proceedings of the IEEE International Conference on Robotics and Automation, Apr. 18-22, 2005, pp. 4703-4708.
Lowe, "Distinctive Image Features from Scale-Invariant Keypoints," International Journal of Computer Vision, Jan. 5, 2004, 28 pp.

(56) References Cited

OTHER PUBLICATIONS

Lucas et al., "An Iterative Image Registration Technique with an Application to Stereo Vision," Proceedings of the 7th International Joint Conference on Artificial Intelligence, Aug. 24-28, 1981, pp. 674-679.
Lupton et al., "Visual-inertial-aided Navigation for High-dynamic Motion in Built Environments Without Initial Conditions," IEEE Transactions on Robotics, vol. 28, No. 1, Feb. 2012, pp. 61-76.
Lynen et al., "Get Out of My Lab: Large-scale, Real-Time Visual-Inertial Localization," Proceedings of robotics: Science and Systems, Jul. 2015, 10 pp.
Martinelli, "Closed-form Solution of Visual-inertial structure from Motion," International Journal of Computer Vision, vol. 106, No. 2, Jan. 2014, 16 pp.
Martinelli, "Vision and IMU Data Fusion: Closed-form Solutions for Attitude, Speed, Absolute Scale, and Bias Determination," IEEE Transactions on Robotics, vol. 28, No. 1, Feb. 2012, pp. 44-60.
Matas et al., "Robust Detection of Lines Using the Progressive Probabilistic Hough Transformation," Computer Vision and Image Understanding, vol. 78, No. 1, Apr. 2000, pp. 119-137.
Maybeck, "Stochastic models, estimation and control," vol. 1, Chapter 1, Academy Press, May 28, 1979, 19 pp.
McLauchlan, "The Variable State Dimension Filter Applied to Surface-Based Structure from Motion CVSSP Technical Report VSSP-TR-4/99," University of Surrey, Department of Electrical Engineering, Dec. 1999, 52 pp.
Meltzer et al., "Edge Descriptors for Robust Wide-baseline Correspondence," Proc. IEEE Conf. Comp. Vision Pall. Recognition., Jun. 23-28, 2008, pp. 1-8.
Mirzaei et al., "A Kalman Filter-based Algorithm for IMU-Camera Calibration: Observability Analysis and Performance Evaluation," IEEE Trans. Robot., vol. 24 No. 5, Oct. 2008, pp. 1143-1156.
Mirzaei et al., "Globally Optimal Pose Estimation from Line Correspondences," IEEE International Conference on Robotics and Automation, May 9-13, 2011, pp. 5581-5588.
Mirzaei et al., "Optimal Estimation of Vanishing Points in a Manhattan World," IEEE Int. Conference on Computer Vision, Nov. 6-13, 2011, pp. 2454-2461.
Montiel et al., "Unified Inverse Depth Parametrization for Monocular SLAM," Proceedings of Robotics: Science and Systems II (RSS-06), Aug. 16-19, 2006, 8 pp.
Mourikis et al., "A Dual-Layer Estimator Architecture for Long-term Localization," Proceedings of the Workshop on Visual Localization for Mobile Platforms, Jun. 24-26, 2008, 8 pp.
Mourikis et al., "A Multi-State Constraint Kalman Filter for Vision-aided Inertial Navigation," IEEE International Conference on Robotics and Automation, Sep. 28, 2006, 20 pp.
Mourikis et al., "A Multi-State Constraint Kalman Filter for Vision-aided Inertial Navigation," IEEE International Conference on Robotics and Automation, Apr. 10-14, 2007, pp. 3565-3572.
Mourikis et al., "On the Treatment of Relative-Pose Measurements for Mobile Robot Localization," IEEE International Conference on Robotics and Automation, Conference Date May 15-19, 2006, Jun. 26, 2006, 8 pp.
Mourikis et al., "Vision-Aided Inertial Navigation for Spacecraft Entry, Descent, and Landing," IEEE Transactions on Robotics, vol. 25, No. 2, Apr. 2009, pp. 264-280.
Mur-Artal, et al., "ORB-SLAM: A Versatile and Accurate Monocular SLAM System," IEEE Transactions on Robotics, vol. 31, No. 5, Oct. 2015, 17 pp.
Mur-Artal, et al., "ORB-SLAM2: An Open-Source SLAM System for Monocular, Stereo and RGB-D Cameras," IEEE Transactions on Robotics, vol. 33, vol. 5, Jun. 2017, 9 pp.
Mur-Artal et al., "Visual-inertial Monocular SLAM with Map Reuse," IEEE Robotics and Automation Letters, vol. 2, No. 2, Apr. 2017, 8 pp.
Nerurkar et al., "C-KLAM: Constrained Keyframe-Based Localization and Mapping," Proceedings of the IEEE International Conference on Robotics and Automation, May 31-Jun. 7, 2014, 6 pp.

Nerurkar et al., "Power-SLAM: A Linear-Complexity, Anytime Algorithm for SLAM," International Journal of Robotics Research, vol. 30, No. 6, May 2011, 13 pp.
Nister et al., "Scalable Recognition with a Vocabulary Tree," 2006 IEEE Computer Society Conference on Computer Vision and Pattern Recognition, vol. 2, Jun. 2006, 8 pp.
Nister et al., "Visual Odometry for Ground Vehicle Applications," Journal of Field Robotics, vol. 23, No. 1, Jan. 2006, 35 pp.
Nocedal et al., "Numerical Optimization," $2^{nd}$ Ed. Springer, 2006, 683 pp. (Applicant points out, in accordance with MPEP 609.04(a), that the year of publication, 2006, is sufficiently earlier than the effective U.S. filing date, so that the particular month of publication is not in issue.).
Oliensis, "A New Structure from Motion Ambiguity," IEEE Transactions on Pattern Analysis and Machine Intelligence, vol. 22, No. 7, Jul. 2000, 30 pp.
Ong et al., "Six DoF Decentralised SLAM," Proceedings of the Australasian Conference on Robotics and Automation, 2003, 10 pp. (Applicant points out, in accordance with MPEP 609.04(a), that the year of publication, 2003, is sufficiently earlier than the effective U.S. filing date, so that the particular month of publication is not in issue.).
Oth et al., "Rolling shutter camera calibration," Proceedings of the IEEE Conference on Computer Vision and Pattern Recognition, Jun. 23-28, 2013, pp. 1360-1367.
Perea et al., "Sliding Windows and Persistence: An Application of Topological Methods to Signal Analysis," Foundations of Computational Mathematics, Nov. 25, 2013, 34 pp.
Prazenica et al., "Vision-Based Kalman Filtering for Aircraft State Estimation and Structure from Motion," AIAA Guidance, Navigation, and Control Conference and Exhibit, Aug. 15-18, 2005, 13 pp.
Qin et al., "VINS-Mono: A Robust and Versatile Monocular Visual-Inertial State Estimator," IEEE Transactions on Robotics, vol. 34, No. 4, Aug. 2018, 17 pp.
Rosten et al., "Machine Learning for High-Speed Corner Detection," Proceedings of the $9^{th}$ European Conference on Computer Vision, May 2006, 14 pp.
Roumeliotis et al., "Augmenting Inertial Navigation With Image-Based Motion Estimation," IEEE International Conference on Robotics and Automation, vol. 4, 2002, 8 pp. (Applicant points out, in accordance with MPEP 609.04(a), that the year of publication, 2002, is sufficiently earlier than the effective U.S. filing date, so that the particular month of publication is not in issue.).
Roumeliotis et al., "Stochastic Cloning: A Generalized Framework for Processing Relative State Measurements," Proceedings of the 2002 IEEE International Conference on Robotics and Automation, May 11-15, 2002, pp. 1788-1795.
Rublee et al., "ORB: An Efficient Alternative to SIFT or SURF," Proceedings of the IEEE International Conference on Computer Vision, Nov. 2011, 8 pp.
Schmid et al., "Automatic Line Matching Across Views," Proceedings of the IEEE Computer Science Conference on Computer Vision and Pattern Recognition, Jun. 17-19, 1997, pp. 666-671.
Servant et al., "Improving Monocular Plane-based SLAM with Inertial Measurements," 2010 IEEE/RSJ International Conference on Intelligent Robots and Systems, Oct. 18-22, 2010, pp. 3810-3815.
Shoemake et al., "Animating rotation with quaternion curves," ACM SIGGRAPH Computer Graphics, vol. 19, No. 3, Jul. 22-26, 1985, pp. 245-254.
Sibley et al., "Sliding Window Filter with Application to Planetary Landing," Journal of Field Robotics, vol. 27, No. 5, Sep./Oct. 2010, pp. 587-608.
Smith et al., "On the Representation and Estimation of Spatial Uncertainty," International Journal of Robotics Research, vol. 5(4), 1986, pp. 56-68. (Applicant points out, in accordance with MPEP 609.04(a), that the year of publication, 1986, is sufficiently earlier than the effective U.S. filing date, so that the particular month of publication is not in issue.).
Smith et al., "Real-time Monocular Slam with Straight Lines," British Machine vision Conference, vol. 1, Sep. 2006, pp. 17-26.

(56) References Cited

OTHER PUBLICATIONS

Soatto et al., "Motion Estimation via Dynamic Vision," IEEE Transactions on Automatic Control, vol. 41, No. 3, Mar. 1996, pp. 393-413.
Soatto et al., "Recursive 3-D Visual Motion Estimation Using Subspace Constraints," International Journal of Computer Vision, vol. 22, No. 3, Mar. 1997, pp. 235-259.
Spetsakis et al., "Structure from Motion Using Line Correspondences," International Journal of Computer Vision, vol. 4, No. 3), Jun. 1990, pp. 171-183.
Strelow, D. W., "Motion Estimation from Image and Inertial Measurements", CMU-CS-04-174, (Nov. 2004), 164 pgs.
Taylor et al., "Parameterless Automatic Extrinsic Calibration of Vehicle Mounted Lidar-Camera Systems," Conference Paper, Mar. 2014, 3 pp.
Taylor et al., "Structure and Motion from Line Segments in Multiple Images," IEEE Transactions on Pattern Analysis and Machine Intelligence, vol. 17, No. 11, Nov. 1995, pp. 1021-1032.
Thorton et al., "Triangular Covariance Factorizations for Kalman Filtering," Technical Memorandum 33-798, National Aeronautics and Space Administration, Oct. 15, 1976, 212 pp.
Thrun et al. "The Graph SLAM Algorithm with Applications to Large-Scale Mapping of Urban Structures," International Journal of Robotics Research, vol. 25, Nos. 5-6, May 2006, 27 pp.
Trawny et al., "Indirect Kalman Filter for 3D Attitude Estimation," University of Minnesota, Department of Computer Science & Engineering, MARS Lab, Mar. 2005, 25 pp.
Triggs et al., "Bundle Adjustment—A Modern Synthesis," Proceedings of the International Workshop on Vision Algorithms: Theory and Practice, Lecture Notes in Computer Science, vol. 1883, Sep. 21-22, 1999, pp. 298-372.
Triggs et al., "Bundle Adjustment—A Modern Synthesis," Vision Algorithms: Theory & Practice, LNCS 1883, Apr. 12, 2002, 71 pp.
Weiss et al., "Real-time Metric State Estimation for Modular Vision-Inertial Systems," Proceedings of the IEEE International Conference on Robotics and Automation, May 9-13, 2011, pp. 4531-4537.
Weiss et al., "Real-time Onboard Visual-inertial State Estimation and Self-calibration of MAVs in Unknown Environment," Proceedings of the IEEE International Conference on Robotics and Automation, May 14-18, 2012, 957-964 pp.
Weiss et al., "Versatile Distributed Pose Estimation and sensor Self-Calibration for an Autonomous MAV," Proceedings of IEEE International Conference on Robotics and Automations, May 14-18, 2012, pp. 31-38.
Weng et al., "Motion and Structure from Line Correspondences: Closed-Form Solution, Uniqueness, and Optimization," IEEE Transactions on Pattern Analysis and Machine Intelligence, vol. 14, No. 3, Mar. 1992, pp. 318-336.
Williams et al., "Feature and Pose Constrained Visual Aided Inertial Navigation for Computationally Constrained Aerial Vehicles," 2011 IEEE International Conference on Robotics and Automation, May 9-13, 2011, pp. 431-438.
Wu et al., "A Square Root Inverse Filter for Efficient Vision-aided Inertial Navigation on Mobile Devices," Proceedings of Robotics: Science and Systems, Jul. 2015, 9 pp.
Zhou et al., "Determining 3d Relative Transformations for any Combination of Range and Bearing Measurements," IEEE Trans. On Robotics, vol. 29 No. 2, Apr. 2013, pp. 458-474.
U.S. Appl. No. 16/425,422, filed May 29, 2019, by Stergious I. Roumeliotis.
Sturm, "Tracking and Mapping in Project Tango," Project Tango, accessed from https://jsturm.de/publications/data/sturm2015_dagstuhl.pdf, accessed on Jun. 1, 2021, published 2015, (Applicant points out, in accordance with MPEP 609.04(a), that the year of publication, 2015, is sufficiently earlier than the effective U.S. filing date, so that the particular month of publication is not in issue.), 29 pp.
International Preliminary Report on Patentability for International Application PCT/US2017/043280, Report dated Jan. 22, 2019, dated Jan. 31, 2019, 8 Pgs.
International Search Report and Written Opinion for International Application No. PCT/US2017/043280, Search completed Dec. 22, 2017, dated Jan. 8, 2018, 11 Pgs.
Higham, "Accuracy and Stability of Numerical Algorithms", Society for Industrial and Applied Mathematics, 2002, 29 pgs.
Filing Receipt and Filed Application for U.S. Provisional U.S. Appl. No. 61/040,473, filed Mar. 28, 2008, dated May 21, 2008.
Antone, "Robust Camera Pose Recovery Using Stochastic Geometry," Massachusetts Institute of Technology, Apr. 24, 2001, 187 pages (Presented in two parts).
Comport et al., "Accurate Quadrifocal Tracking for Robust 3D Visual Odometry," IEEE International Conference on Robotics and Automation, 2007, pp. 40-45.
Cumani et al., "Integrating Monocular Vision and Odometry for SLAM," WSEAS Transactions on Computers, 2003, 6 pages.
Eade et al., "Monocular SLAM as a Graph of Coalesced Observations," IEEE 11th International Conference on Computer Vision, 2007, pp. 1-8.
George et al., "Inertial Navigation Aided by Monocular Camera Observations of Unknown Features," IEEE International Conference on Robotics and Automation, Roma, Italy, Apr. 10-14, 2007, pp. 3558-3564.
Goldshtein et al., "Seeker Gyro Calibration via Model-Based Fusion of Visual and Inertial Data," 10th International Conference on Information Fusion, 2007, pp. 1-8.
Guo et al., "Efficient Visual-Inertial Navigation Using a Rolling-Shutter Camera with Inaccurate Timestamps," University of Minnesota, Multiple Autonomous Robotic Systems Laboratory Technical Report No. 2014-001, Feb. 2014, 9 pages.
Gupta et al., "Terrain Based Vehicle Orientation Estimation Combining Vision and Inertial Measurements," Journal of Field Robotics vol. 25, No. 3, 2008, pp. 181-202.
Hesch et al., "Camera-IMU-Based Localization: Observability Analysis and Consistency Improvement," The International Journal of Robotics Research, 2014, vol. 33, No. 1, pp. 182-201.
Hesch et al., "Consistency Analysis and Improvement for Single-Camera Localization," IEEE Computer Society Conference on Computer Vision and Pattern Recognition Workshops, 2012, pp. 15-22.
Klein et al., "Improving the Agility of Keyframe-Based SLAM," ECCV 2008, Part II, LNCS 5303, pp. 802-815.
Mourikis et al., "A Multi-State Constraint Kalman Filter for Vision-Aided Inertial Navigation," University of Minnesota, Dept. of Computer Science and Engineering, 2006, 20 pages.
Nerurkar et al., "C-KLAM: Constrained Keyframe Localization and Mapping for Long-Term Navigation," IEEE International Conference on Robotics and Automation, 2014, 3 pages.
Ragab et al., "EKF Based Pose Estimation Using Two Back-to-Back Stereo Pairs," 14th IEEE International Conference on Image Processing, Sep. 16-19, 2007, 4 pages.
Roumeliotis et al., Prosecution History for U.S. Appl. No. 12/383,371, filed Mar. 23, 2009, issued on Sep. 19, 2017 as U.S. Pat. No. 9,766,074, 608 pages.
Roumeliotis et al., Prosecution History for U.S. Appl. No. 15/706,149, filed Sep. 15, 2017, issued on Jun. 2, 2020 as U.S. Pat. No. 10,670,404, 268 pages.
Se et al., "Visual Motion Estimation and Terrain Modeling for Planetary Rovers," International Symposium on Artificial Intelligence for Robotics and Automation in Space, Munich, Germany, Sep. 2005, 8 pages.
Torr et al., "Robust Parameterization and Computation of the Trifocal Tensor," Image and Vision Computing, vol. 15, No. 8, Aug. 1997, 25 pages.
Trawny et al., "Vision-Aided Inertial Navigation for Pin-Point Landing using Observations of Mapped Landmarks," Journal of Field Robotics, vol. 24, No. 5, May 2007, pp. 357-378.
Yu et al., "Controlling Virtual Cameras Based on a Robust Model-Free Pose Acquisition Technique," IEEE Transactions on Multimedia, No. 1, 2009, pp. 184-190.
Diel et al., "Epipolar Constraints for Vision-Aided Inertial Navigation," Seventh IEEE Workshops on Applications of Computer Vision (WACV/MOTION'05), vol. 1, 2005, pp. 221-228.

(56) References Cited

OTHER PUBLICATIONS

Heyden et al., "Structure and Motion in 3D and 2D from Hybrid Matching Constraints," 2007, 14 pages.

Mourikis et al., "SC-KF Mobile Robot Localization: A Stochastic Cloning Kalman Filter for Processing Relative-State Measurements," IEEE Transactions on Robotics, vol. 23. No. 4, Aug. 2007, pp. 717-730.

Randeniya, "Automatic Geo-Referencing By Integrating Camera Vision And Inertial Measurements," University of South Florida, Scholar Commons, Graduate Theses and Dissertations, 2007, 177 pages.

Yu, "Model-less Pose Tracking," The Chinese University of Hong Kong, Thesis Submitted for the Degree of Doctor of Philosophy, dated Jul. 2007, 153 pages.

\* cited by examiner

SQUARE-ROOT MULTI-STATE CONSTRAINT KALMAN FILTER FOR VISION-AIDED INERTIAL NAVIGATION SYSTEM

This application is a National Stage application under 35 U.S.C. § 371 of PCT Application No. PCT/US2017/043280, entitled "SQUARE-ROOT MULTI-STATE CONSTRAINT KALMAN FILTER FOR VISION-AIDED INERTIAL NAVIGATION SYSTEM" and filed on Jul. 21, 2017, which claims the benefit of U.S. Provisional Patent Application No. 62/365,803, entitled "SQUARE-ROOT MULTI-STATE CONSTRAINT KALMAN FILTER FOR VISION-AIDED INERTIAL NAVIGATION SYSTEM" and filed on Jul. 22, 2016. The entire contents of application nos. PCT/US2017/043280 and 62/365,803 are incorporated herein by reference.

GOVERNMENT RIGHTS

This invention was made with government support under Air Force Office of Scientific Research and Multidisciplinary Research Program of the University Research Initiative grant no. FA9550-10-1-0567. The government has certain rights in the invention.

TECHNICAL FIELD

This disclosure relates to navigation and, more particularly, to vision-aided inertial navigation.

BACKGROUND

In general, a Vision-aided Inertial Navigation System (VINS) fuses data from a camera and an Inertial Measurement Unit (IMU) to track the six-degrees-of-freedom (d.o.f) position and orientation (pose) of a sensing platform through an environment. In this way, the VINS combines complementary sensing capabilities. For example, an IMU can accurately track dynamic motions over short time durations, while visual data can be used to estimate the pose displacement (up to scale) between consecutive views. For several reasons, VINS has gained popularity to address GPS-denied navigation. During the past decade, VINS have been successfully applied to robots, spacecraft, automotive, and personal localization (e.g., by use of smartphones or laptops), demonstrating real-time performance.

SUMMARY

In general, this disclosure describes techniques for implementing a square-root multi-state constraint Kalman filter (SR-MSCKF) for vision-aided inertial navigation. In one example, at least one image source of a VINS produces image data for a plurality of poses of a frame of reference along a trajectory within an environment over a period of time. In some examples, the image data includes features that were each observed within the environment at poses of the frame of reference along the trajectory. In some examples, the at least one image source observes one or more of the features at multiple ones of the poses of the frame of reference along the trajectory. Further, a motion sensor of the VINS provides motion data of the frame of reference in the environment for the period of time. The VINS further includes a hardware-based processor communicatively coupled to the image source and communicatively coupled to the motion sensor.

In accordance with the techniques of the disclosure, the processor computes estimates for at least a position and orientation of the frame of reference for each of the plurality of poses of the frame of reference along the trajectory. In one example, the processor executes an Extended Kalman Filter (EKF)-based estimator. In this example, the EKF-based estimator computes, for the one or more of the features observed from multiple poses along the trajectory, one or more constraints that geometrically relate the multiple poses from which the respective feature was observed. The EKF-based estimator further determines, in accordance with the motion data and the one or more computed constraints, state estimates for the position and orientation of the frame of reference for each of the plurality of poses along the trajectory. Further, the EKF-based estimator determines uncertainty data for the state estimates and maintains the uncertainty data as a square root factor of a covariance matrix.

In one example, the techniques of the disclosure describe a VINS comprising: at least one image source to produce image data for a plurality of poses of a frame of reference along a trajectory within an environment over a period of time, wherein the image data includes features that were each observed within the environment at poses of the frame of reference along the trajectory, wherein one or more of the features were each observed at multiple ones of the poses of the frame of reference along the trajectory; a motion sensor configured to provide motion data of the frame of reference in the environment for the period of time; and a hardware-based processor communicatively coupled to the image source and communicatively coupled to the motion sensor, the processor configured to compute estimates for at least a position and orientation of the frame of reference for each of the plurality of poses of the frame of reference along the trajectory, wherein the processor executes an Extended Kalman Filter (EKF)-based estimator configured to: for one or more of the features observed from multiple poses along the trajectory, compute one or more constraints that geometrically relate the multiple poses from which the respective feature was observed; determine, in accordance with the motion data and the one or more computed constraints, state estimates for the position and orientation of the frame of reference for each of the plurality of poses along the trajectory; and determine uncertainty data for the state estimates, wherein the EKF-based estimator maintains the uncertainty data to comprise a square root factor of a covariance matrix.

In another example, the techniques of the disclosure describe a method comprising: receiving, with a processor of a VINS and from at least one image source of the VINS, image data for a plurality of poses of a frame of reference along a trajectory within an environment over a period of time, wherein the image data includes features that were each observed within the environment at poses of the frame of reference along the trajectory, and wherein one or more of the features were each observed at multiple ones of the poses of the frame of reference along the trajectory; receiving, with the processor and from a motion sensor communicatively coupled to the processor, motion data of the frame of reference in the environment for the period of time; computing, with the processor, state estimates for at least a position and orientation of the frame of reference for each of the plurality of poses of the frame of reference along the trajectory by executing an Extended Kalman Filter (EKF)-based estimator, wherein computing the state estimates comprises: for one or more of the features observed from multiple poses along the trajectory, computing one or more constraints that geometrically relate the multiple poses from which the respective feature was observed; determining, in accordance with the motion data and the one or more computed constraints, state estimates for the position and orientation of the frame of reference for each of the plurality of poses along the trajectory; and determining uncertainty data for the state estimates, wherein the uncertainty data comprises a square root factor of a covariance matrix.

In another example, the techniques of the disclosure describe a non-transitory computer-readable medium comprising instructions that, when executed, cause a processor of a VINS to: receive, from at least one image source of the VINS, image data for a plurality of poses of a frame of reference along a trajectory within an environment over a period of time, wherein the image data includes features that were each observed within the environment at poses of the frame of reference along the trajectory, and wherein one or more of the features were each observed at multiple ones of the poses of the frame of reference along the trajectory; receive, from a motion sensor communicatively coupled to the processor, motion data of the frame of reference in the environment for the period of time; compute, state estimates for at least a position and orientation of the frame of reference for each of the plurality of poses of the frame of reference along the trajectory by executing an Extended Kalman Filter (EKF)-based estimator, wherein, to compute the state estimates, the processor is further configured to: for one or more of the features observed from multiple poses along the trajectory, compute one or more constraints that geometrically relate the multiple poses from which the respective feature was observed; determine, in accordance with the motion data and the one or more computed constraints, state estimates for the position and orientation of the frame of reference for each of the plurality of poses along the trajectory; and determine uncertainty data for the state estimates, wherein the uncertainty data comprises a square root factor of a covariance matrix.

The details of one or more embodiments of the techniques are set forth in the accompanying drawings and the description below.

BRIEF DESCRIPTION OF DRAWINGS

Like reference characters refer to like elements throughout the figures and description.

DETAILED DESCRIPTION

Techniques are described for implementing an estimator for vision-aided inertial navigation systems (VINS) based on a forward Extended Kalman Filter for localization. In particular, a square root (SQRT) form of a Multi-State Constraint Kalman Filter (MSCKF) is described.

The techniques described herein may provide increased numerical stability, e.g., can handle double the condition number of the covariance matrix as compared to the Multi-State Constraint Kalman Filter. This may be advantageous for may applications, such as for stereoscopic applications in which the eigenvalues are close to zero. Moreover, in some situations, the SQRT MSCKF estimator described herein may achieve increased performance over the SQRT form of an Inverse Sliding Window Filter estimator for VINS.

Figure 1:
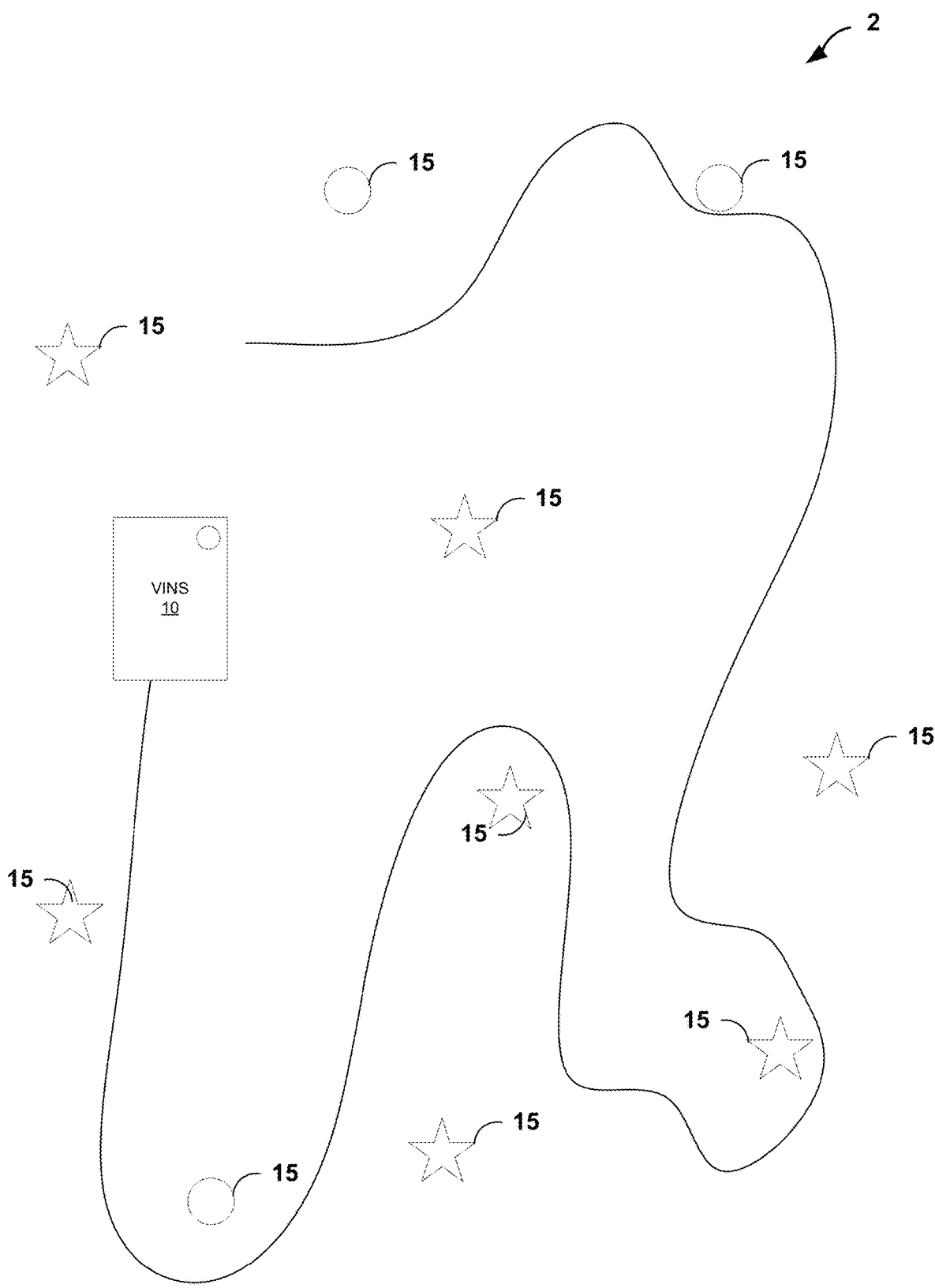
FIG. 1 is a block diagram illustrating a VINS that navigates an environment having a plurality of features using one or more image sources and inertial measurement unit (IMUs), in accordance with the techniques of the disclosure.

FIG. 1 is a block diagram illustrating a VINS 10 that navigates an environment 2 having a plurality of features 15 using one or more image sources and inertial measurement unit (IMUs). That is, VINS 10 is one example of a device that utilizes a 3D map of environment 2 to determine the position and orientation of VINS 10 as the VINS traverses the environment, where the map may be constructed in real-time by the VINS or previously constructed. Environment 2 may, for example, represent an environment where conventional GPS-signals are unavailable for navigation, such as on the moon or a different planet or even underwater. As additional examples, environment 2 may represent an indoor environment such as the interior of a building, such as a convention center, shopping mall, sporting arena, business office and the like. Features 15, also referred to as landmarks, represent objects visible within environment 2, such as rocks, trees, signs, walls, stairs, chairs, tables, and the like. Features 15 may be moving or stationary objects within environment 2.

VINS 10 represents any mobile device that implements the techniques described herein. VINS 10 may be, for example, a robot, mobile sensing platform, a mobile phone, a laptop, a tablet computer, a vehicle, a wearable device such as smart glasses and the like. The increasing range of sensing capabilities offered by modern mobile devices, such as cell phones and tables, as well as their increasing computational resources make them ideal for applying VINS. In some implementations, the techniques described herein may be used within environments having GPS or similar signals and may provide supplemental localization and mapping information.

As one example, VINS 10 may be an autonomous robot although, as discussed above, VINS 10 may take the form of other devices that implement the techniques described herein. While traversing environment 2, the image sources of VINS 10 produce image data at discrete time instances along the trajectory within the three-dimensional (3D) environment, where the image data captures features 15 within the 3D environment at each of the time instances. In addition, IMUs of VINS 10 produces IMU data indicative of a dynamic motion of VINS 10.

As described in detail herein, VINS 10 includes a hardware-based computing platform that implements an estimator that fuses the image data and the IMU data to perform localization of VINS 10 within environment 10. In general, the estimator process image data 14 and IMU data 18 to estimate the 3D IMU pose and velocity together with the time-varying IMU biases, camera rolling shutter and IMU-camera time synchronization and to produce, based on the captured image data, estimates for poses of VINS 10 along the trajectory and, in some cases, a position and orientation within an overall map of the environment. Utilizing these techniques, VINS 10 may navigate environment 2 and, in some cases, may construct or augment the mapping information for the environment including the positions of features 15. In one example, the map may be constructed using cooperative mapping techniques.

The estimator of VINS 10 may operate according to different types of estimators. For example, in an example implementation, VINS 10 implements an inverse, sliding-window filter (ISWF). In other examples, VINS 10 implements a sliding-window Iterative Kalman Smoother (IKS).

In one example, as described herein, the estimator implements a square root (SQRT) form of a Multi-State Constraint Kalman Filter (MSCKF) for localization within environment 10. In one example implementation, as compared to the regular MSCKF, which maintains the covariance matrix, this square-root variant maintains the Cholesky factor of the covariance matrix. This way, the SR-MSCKF algorithm may achieve higher numerical stability than the MSCKF. In linear algebra, the Cholesky factorization is a decomposition of a symmetric positive definite matrix (as is the case of the covariance matrix here) into the product of a lower-triangular matrix (the Cholesky factor) and its transpose. In our context, the use of this factor allows better numerical accuracy of the algorithm as compared to maintaining the covariance matrix itself.

Figure 2:
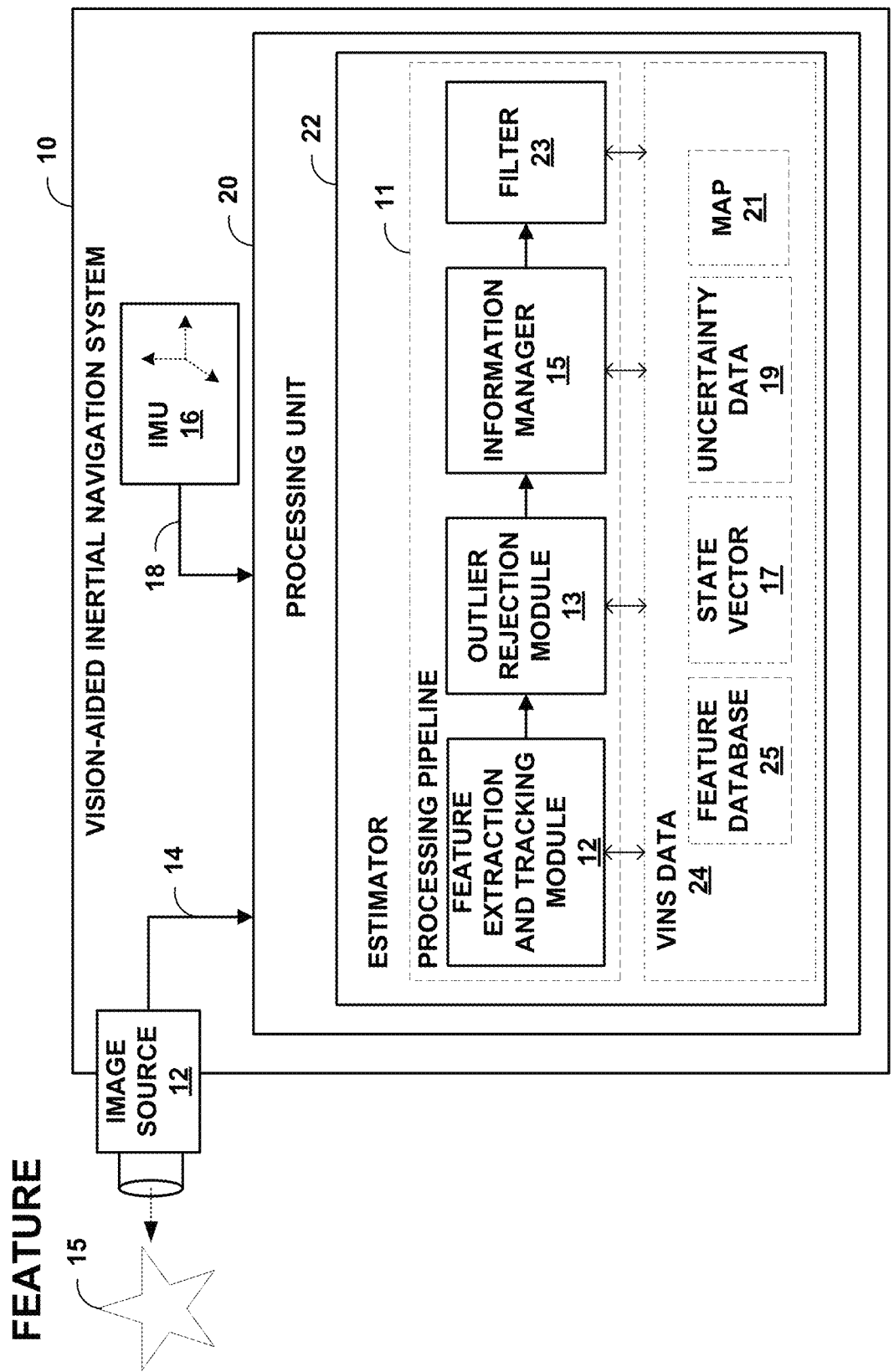
FIG. 2 is block diagram illustrating an example implementation of the VINS of FIG. 1 in further detail.

FIG. 2 is block diagram illustrating an example implementation of VINS 10 of FIG. 1 in further detail. Image source 12 of VINS 10 images an environment in which VINS 10 operates so as to produce image data 14. That is, image source 12 generates image data 14 that captures a number of features visible in the environment surrounding VINS 10. Image source 12 may be, for example, one or more cameras that capture 2D or 3D images, a laser scanner or other optical device that produces a stream of 1D image data, a depth sensor that produces image data indicative of ranges for features within the environment, a stereo vision system or a vision system having multiple cameras to produce 3D information, a Doppler radar and the like. In this way, image data 14 provides exteroceptive information as to the external environment in which VINS 10 operates. Moreover, image source 12 may capture and produce image data 14 at time intervals in accordance one or more clocks associated with the image source. In other words, image source 12 may produce image data 14 at each of a first set of time instances along a trajectory within the three-dimensional (3D) environment, wherein the image data captures features 15 within the 3D environment at each of the first set of time instances.

IMU 16 produces IMU data 18 indicative of a dynamic motion of VINS 10. IMU 16 may, for example, detect a current acceleration using one or more accelerometers as VINS 10 is translated, and detect the rotational velocity (i.e., the rate of change in rotational attributes like pitch, roll and yaw) using one or more gyroscopes as VINS 10 is rotated. IMU 14 produces IMU data 18 to specify the detected motion. In this way, IMU data 18 provides proprioceptive information as to the VINS 10 own perception of its movement and orientation within the environment. Moreover, IMU 16 may produce IMU data 18 at time intervals in accordance a clock associated with the IMU. In this way, IMU16 produces IMU data 18 for VINS 10 along the trajectory at a second set of time instances, wherein the IMU data indicates a motion of the VINS along the trajectory. In many cases, IMU 16 may produce IMU data 18 at much faster time intervals than the time intervals at which image source 12 produces image data 14. Moreover, in some cases the time instances for image source 12 and IMU 16 may not be precisely aligned such that a time offset exists between the measurements produced, and such time offset may vary over time. In such cases, VINS 10 may compensate and correct for any misalignment.

In general, estimator 22 fuses image data 14 and IMU data 18 to determine a position and orientation of VINS 10 as well as positions of features 15 as the VINS traverses environment 2. That is, estimator 22 of processing unit 20 process image data 14 and IMU data 18 to compute state estimates for the various degrees of freedom of VINS 10 and, from the state estimates, computes position, orientation, speed, locations of observable features, a map to be used for localization, an odometry, or other higher order derivative information represented by VINS data 24. Processing unit 20 may, for example, comprise a hardware-based computing platform having one or more processors that execute software instructions and/or application-specific hardware for implementing the techniques described herein.

In the example of FIG. 2, estimator 22 comprises a processing pipeline 11 for measurements from image source 12 and IMU 16. In this example, processing pipeline 11 includes feature extraction and tracking module 12, outlier rejection module 13, information manager 15 and filter 23.

Feature extraction and tracking module 12 extracts features 15 from image data 14 acquired by image source 12 and stores information describing the features in feature database 25. Feature extraction and tracking module 12 may, for example, perform corner and edge detection to identify features and track features 15 across images using, for example, the Kanade-Lucas-Tomasi (KLT) techniques.

Outlier rejection module 13 provides robust outlier rejection of measurements from image source 12 and IMU 16. For example, outlier rejection module may apply a Mahalanobis distance tests to the feature measurements to identify and reject outliers. As one example, outlier rejection module 13 may apply a 2-Point Random sample consensus (RANSAC) technique.

Information manager 15 selects features from feature database 15 and feeds measurements for the selected features to filer 23, which may perform simultaneous localization of the position and orientation for VINS 10 within environment 2 by iteratively optimizing over measurements throughout trajectory, which can be computationally extensive. As described herein, estimator 22 implements filter 23 that iteratively updates predicted state estimates over a bounded-size sliding window of state estimates for poses of VINS 10 and positions of features 15 in real-time as new image data 14 and IMU data 18 are obtained. That is, by implementing the filtering approach, estimator 22 of VINS 10 marginalizes out past state estimates and measurements through the sliding window as VINS 10 traverses environment 2 for simultaneous localization and mapping (SLAM).

In one example implementation, filter 23 of estimator 22 recursively operates on the streams of image data 14 and IMU data 18 to compute a sliding window of predicted estimates for the state variables maintained within state vector 17 along with uncertainty data 19 representing the respective uncertainties in the form of one or more uncertainty matrices, which may take the form of covariance matrices for an extended Kalman filter (EKF). For example, at any time instant, the EKF state 17 vector comprises the evolving IMU state and a history of up to Nmax past poses of the camera state vector 17 and may take the form of:

$$x = [x_I x_{I_{k+n-1}} \cdots x_{I_k}]$$

where $x_I$ denotes the current pose, and $x_{I_i}$ for $I = k+n-1, \ldots, k$ are the IMU poses in the sliding window, corresponding to the time instants of the last n camera measurements. The current robot pose may be defined as:

$$x_I = [{}^I q_G^T \, {}^G v_I^T \, {}^G p_I^T \, b_a^T \, b_g^T \, \lambda_d \, \lambda_T]^T$$

where ${}^I q_G$ is the quaternion representation of the orientation of $\{G\}$ in the IMU's frame of reference $\{I\}$, ${}^G v_I$ and ${}^G p_I$ are the velocity and position of $\{I\}$ in $\{G\}$ respectively, while $b_a$ and $b_g$ correspond to gyroscope and accelerometer biases.

Estimator 22 may implement filter 23 such that uncertainty data 19 takes the form of a matrix that contains estimates of the uncertainty of each predicted state estimate in state vector 17 as well as a correlation between uncertainties. When a subsequent measurement is observed from either image data 14 or IMU data 18, filter 23 updates the sliding window of predicted state estimates with state vector 17 and the uncertainty data 19. In general, estimator 22 operates in real-time using the present input measurements of image data 14 and IMU data 18 and the previously calculated state estimates and its uncertainty matrix. In general, when new image data 14 or IMU data 18 is received, filter 23 projects the measurements as the data arrives onto the state estimates within state vector 17 to re-compute the predicted states and to update respective uncertainty data 19 for each state estimate. Any difference between the predicted state estimates as computed by estimator 22 and the actual feature measurements is referred to as a residual.

In some examples, estimator 22 iteratively processes measurements from image data 14 and IMU data 18 to update estimates only keyframes (key robot/device poses) and key landmarks while also exploiting information (e.g., visual observations and odometry measurements) available to the non-keyframes along the trajectory. In such example implementations, filter 23 projects new measurements onto the keyframes, by generating consistent pose (position and orientation) constraints between keyframes. As used herein, the term keyframes refers to the individual poses of the VINS 10 for which position and orientation of the VINS are to be estimated. In contrast, the term non-keyframes refers to intermediate poses between keyframes and for which, in some examples, complete state estimates of the VINS are not computed. In these example implementations, information from non-keyframes, acquired between keyframes, is not discarded. Instead, this information is projected on to estimates in the state vector associated with the keyframes, in order to generate tight constraints between the keyframes. For example, information from a non-keyframe may be projected onto a preceding keyframe to compute relative position and orientation constraints between the preceding keyframe and the non-keyframe.

Estimator 22 processes inertial and visual measurements to compute, based on the image data and the IMU data, state estimates for at least a position and orientation of VINS 10 for a plurality of poses of the VINS along the trajectory. That is, estimator 22 process image data 14 and IMU data 18 to update within state vector 17 estimates for the 3D IMU pose and velocity together with the time-varying IMU biases so as to determining the position and orientation of estimator 22 within the environment represented by map 21, where the map may be initially constructed using the cooperative mapping information described herein. Estimator 22 may, in accordance with the techniques described herein, apply estimation techniques that compute state estimates for 3D poses of IMU 16 at each of the first set of time instances associated with capture of the IMU data and 3D poses of image source 12 at each of the second set of time instances associated with capture of the image data along the trajectory.

In this example implementation, VINS 10 provides two sources of information: motion information (IMU data 18) from an IMU 14, and image data 14 (e.g., feature observations) from image source 12. Estimator 22 may classify the features observations into two main categories: simultaneous localization and mapping (SLAM) features for which estimates are included and updated within a complex system state vector 17 maintained by estimator 22, and multi-state constraint Kalman filter (MSCKF) features for which the estimator has determined to exclude corresponding estimates in the state vector but instead used the features to generate constraints that geometrically constrain the states for the poses of VINS 10 from which the MSCKF feature was observed. That is, rather than maintain state estimates for positions of each observed feature 15 within its internal state vector, the estimator may group the images per feature and elect to exclude state estimates for one or more of those features (i.e., MSCKF features) from its state vector that were observed from multiple poses along the trajectory. For these features excluded from the state vector, referred to as MSCKF features, estimator 22 computes geometric constraints that constrain state estimates for other poses within the sliding window state vector and that are used to compute state updates for those state estimates within the state vector. In this way, MSCKF features relate and constrain estimated poses within the sliding window. They require less computations than SLAM features since their feature states are not directly estimated.

In one example, as described herein, the estimator implements a square root (SQRT) form of a Multi-State Constraint Kalman Filter (MSCKF) for localization within environment 10. The estimator may, for example, exclude from the state vector state information representing estimates for positions within the environment for the features that were each observed from the multiple poses and for which the one or more constraints were computed. Moreover, the covariance matrix, from which the square root factor is determined, excludes data for the features that were each observed from the multiple poses and for which the one or more constraints were computed.

As mentioned above, by maintaining the Cholesky factor, the techniques described herein achieve better numerical accuracy as compared to maintaining the covariance matrix itself. This may provide a significant advantage over other estimators. Further, as a result of maintaining the Cholesky factor, the steps (propagation, update, and marginalization) involved in the estimation computation are modified as described herein.

The step of propagation refers to operations by the estimator 22 of using image data and IMU data between consecutive states to propagate state vector data along the sliding window filter. The step of updating refers to operations by the estimator 22 of using the image data 14 and the IMU data 18 to update the state vector 17 and the covariance of uncertainty data 19. The step of marginalization refers to operations by the estimator 22 of removing older states from the sliding window filter 23 to maintain constant computational complexity. Additional description of each of these steps is provided in detail below.

As a result of the estimation, estimator 22 performs localization so as to track the position and orientation of the device (frame of reference) within the environment. VINS 10 may output on a display the determined trajectory as superimposed on a 2D or 3D graph of the environment or regions thereof. As additional examples, VINS 10 may output to the display coordinates representing the position with the environment. Moreover, VINS 10 may control navigation of a device, such as a robot, vehicle or mobile computing device by outputting the position and/or instructions for navigating the environment, e.g., to a destination.

Figure 3:
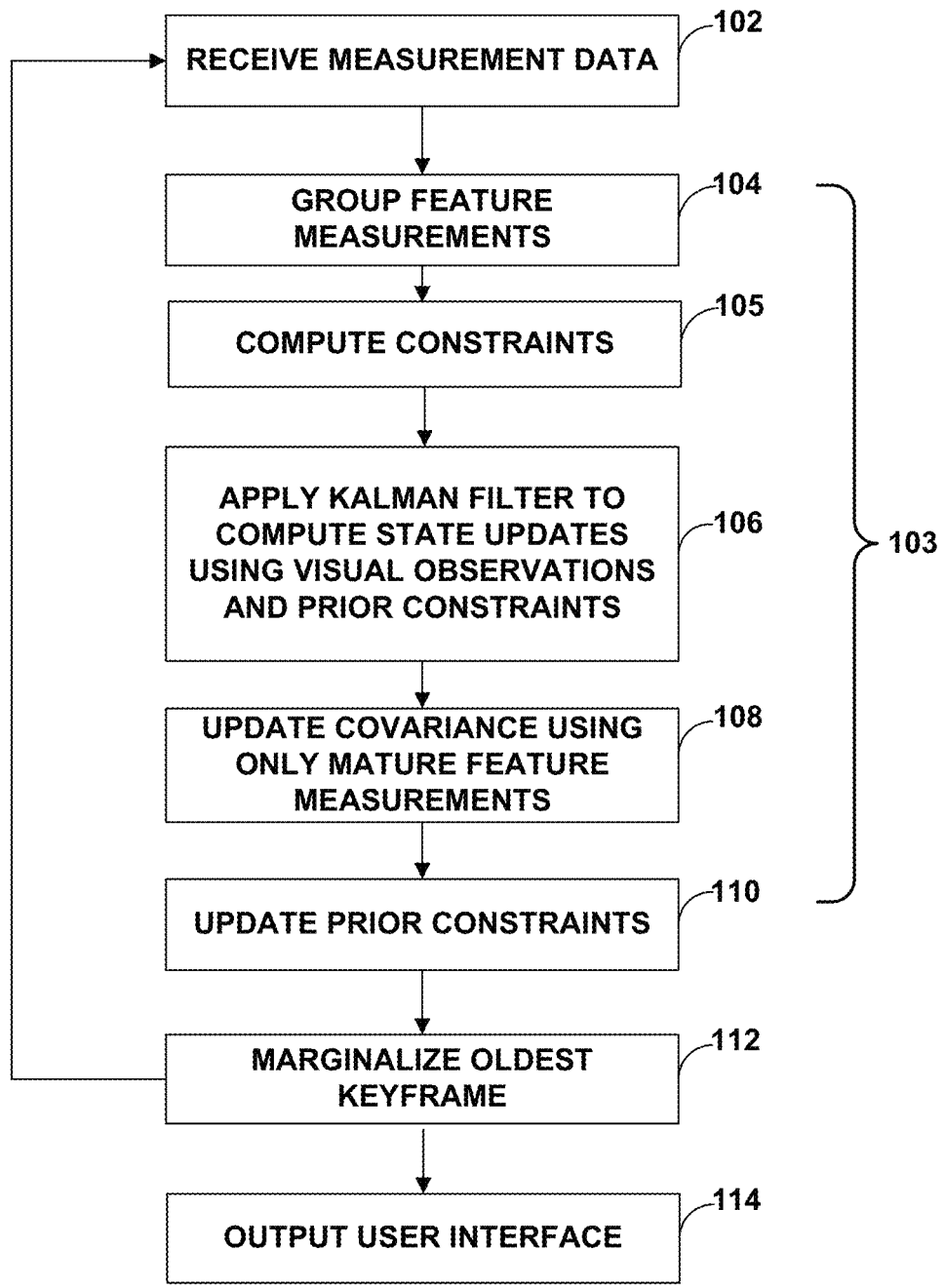
FIG. 3 is a flowchart illustrating an example operation of an estimator, in accordance with the techniques of the disclosure.

FIG. 3 is a flowchart illustrating an example operation of estimator 22, in accordance with the techniques of the disclosure. The device may, for example, comprise a vision-aided inertial navigation system, mobile device, laptop, table, robot, vehicle, server, cloud-based processing system or other device having a processor or other operating environment for implementing the techniques described herein. For purposes of explanation, FIG. 3 will be described with respect to VINS 10 and estimator 22 of FIG. 1.

During operation, estimator 22 receives measurement data observed along the trajectory (100). That is, estimator 22 receives image data 14 produced by an image source 12 of the vision-aided inertial navigation system 10 for keyframes and non-keyframes along a trajectory of the VINS. In addition, estimator 22 receives, from an inertial measurement unit (IMU) 16, IMU data 18 indicative of motion of VINS 10 along the trajectory for the keyframes and the one or more non-keyframes. In this way, VINS 10 receives and records, within VINS data 24, image data 14 and IMU data 18 for keyframes and non-keyframes along the trajectory. Each keyframe and non-keyframe may correspond to a pose (position and orientation) of VINS 10 including landmarks (features) observed within the environment at that pose. In general, the term keyframes refers to the individual poses of the VINS for which position and orientation of the VINS are to be estimated. In contrast, the term non-keyframes refers to intermediate poses between keyframes and for which complete state estimates of the VINS are not computed.

Based on the sliding window of image data and IMU data, estimator 22 applies an extended Kalman filter to iteratively update a state vector to determine state estimates (linearization points) for each pose of the VINS and each landmark (103). For example, estimator 22 may update a state vector to compute state estimates for the position and the orientation of the VINS and for one or more landmarks observed from the VINS at various poses along the trajectory. In an example implementation, the state vector includes state estimates (quantities being estimated) for at least a position and orientation of the vision-aided inertial navigation system for a plurality of poses of the VINS along the trajectory. Along with the state vector, the estimator maintains a respective covariance for each of the state estimates, where the respective covariance represents the amount of uncertainty in the corresponding state estimate.

For example, as shown in FIG. 3, for each current time epoch, estimator 22 first determines, from the image data, feature measurements corresponding to the features observed from the poses along the trajectory and groups the feature measurements according to the features observed within the image data (104). For one or more of the features observed that were from multiple poses along the trajectory, estimate 22 computes, based on the respective group of feature measurements for the feature, one or more constraints that geometrically relate the multiple poses from which the respective feature was observed (105). Those features for which geometric constraints are computed may be viewed as MSCKF features that are excluded from the state vector by estimator 22.

As one example of the techniques of the disclosure, estimator 22 uses IMU data 18 between consecutive states to propagate state vector 17 along the filter 23. For example, estimator 22 maintains a state vector x comprising poses and other variables of interest over a sliding window of m+2 poses, for a number k of time steps. The estimator 22 maintains the following information in the state vector for the sliding window: the state estimate, $\hat{x}_{k-m:k}$, and the corresponding lower-triangular square-root factor, $L_{k-m:k}$ of a covariance matrix $P_{k-m:k}$ such that $$P_{k-m:k} = L_{k-m:k} L_{k-m:k}^T$$

As described herein, the notation $\hat{x}_{k-m:k}$ refers to the state vector comprising all states from time step k-m to k, and similarly for L and P.

This corresponds to the following cost function:

$$C_k = \|x_{k-m:k} - \hat{x}_{k-m:k}\|_{P_{k-m:k}}^2 = \|L_{k-m:k}^{-1} \tilde{x}_{k-m:k}\|_I^2$$

where $\tilde{x}_{k-m:k} = x_{k-m:k} - \hat{x}_{k-m:k}$ is the error state at time step k.

At the next step k+1, a new state, $x_{k+1}$ is added into the sliding window of filter 23. In one example, estimator 22 performs state propagation through filter 23 using IMU measurement data between consecutive states $x_k$ and $x_{k+1}$. The IMU measurements contribute a linearized cost term of the form:

$$C_u = \left\| [0 \; \Phi_k \; -I] \begin{bmatrix} \tilde{x}_{k-m:k-1} \\ \tilde{x}_k \\ \tilde{x}_{k+1} \end{bmatrix} - \delta u_k \right\|_{Q_k}^2$$

where $\Phi_k$ is the linearized state-transition matrix, $\delta u_k$ is the residual, and $Q_k$ is the IMU noise covariance matrix of the uncertainty data, respectively. Accordingly, the cost function after propagating the state vector data is:

$$C_{k+1}^{\ominus} = C_k + C_u = \|L_{k-m:k}^{-1} \tilde{x}_{k-m:k}\|_I^2 + \left\| [0 \; \Phi_k \; -I] \begin{bmatrix} \tilde{x}_{k-m:k-1} \\ \tilde{x}_k \\ \tilde{x}_{k+1} \end{bmatrix} - \delta u_k \right\|_{Q_k}^2 =$$

$$\left\| \begin{bmatrix} L_{k-m:k}^{-1} & 0 \\ 0 \; Q_k^{-\frac{1}{2}} \Phi_k & -Q_k^{-\frac{1}{2}} \end{bmatrix} \begin{bmatrix} \tilde{x}_{k-m:k-1} \\ \tilde{x}_k \\ \tilde{x}_{k+1} \end{bmatrix} - \begin{bmatrix} 0 \\ Q_k^{-\frac{1}{2}} \delta u_k \end{bmatrix} \right\|_I^2 =$$

$$\left\| \begin{bmatrix} L_{k-m:k} & 0 \\ [0 \; \Phi_k] L_{k-m:k} & -Q_k^{\frac{1}{2}} \end{bmatrix}^{-1} \begin{bmatrix} \tilde{x}_{k-m:k-1} \\ \tilde{x}_k \\ \tilde{x}_{k+1} \end{bmatrix} - \begin{bmatrix} 0 \\ Q_k^{-\frac{1}{2}} \delta u_k \end{bmatrix} \right\|_I^2 =$$

$$\| L_{k-m:k+1}^{\ominus -1} \tilde{x}_{k-m:k+1} - r_{k-m:k+1}^{\ominus} \|_I^2$$

where $Q_k^{1/2}$ is the lower-triangular Cholesky factor of the matrix $Q_k$, and $$L_{k-m:k+1}^{\ominus} \triangleq \begin{bmatrix} L_{k-m:k} & 0 \\ \Phi_k L_{k-m:k}(k, :) & -Q_k^{\frac{1}{2}} \end{bmatrix}, \; r_{k-m:k+1}^{\ominus} \triangleq \begin{bmatrix} 0 \\ Q_k^{-\frac{1}{2}} \delta u_k \end{bmatrix}$$

where $L_{k-m:k}(k,:)$ denotes the k-th block row of $L_{k-m:k}$. Because $L_{k-m:k}$ and $Q_k^{1/2}$ are lower-triangular, $L_{k-m:k+1}^{\ominus}$ is lower-triangular. Accordingly, the propagated covariance factor of the uncertainty data is given by $L_{k-m:k+1}^{\ominus}$, which estimator 22 obtains by augmenting the previous prior factor $L_{k-m:k}$, as shown above.

Next, filter 23 of estimator 22 applies an EKF update to update, within the sliding window, each of the state estimates for the VINS and for the features using the IMU data captured throughout the sliding window and the image data obtained at the plurality of poses within the sliding window (106). For example, estimator 22 applies the EKF update to recompute, based on the sliding window of data, the state estimates for the VINS and for the positions of the features with the environment, as represented within the state vector, using (1) the IMU data and the image data associated with features observed at any of the plurality of poses within the sliding window, and (2) the set of computed prior constraints linearly constraining the state estimates for the poses. In some examples, estimator 22 utilizes features associated with all poses within the sliding window. In other examples, estimator 22 may utilizes the budgeting techniques described herein to apply an estimation policy for deciding, which measurements will be processed based on the available computational resources the current EKF update.

Next, estimator 22 updates, for each of the state estimates, the respective covariance of uncertainty data (108). As described herein, uncertainty data may comprise a square root factor of a covariance matrix. For example, estimator 22 may maintain the uncertainty data in the form of the Cholesky factor of the covariance matrix.

As one example of the techniques of the disclosure, estimator 22 uses visual observations and image data, such as that obtained with a camera or other image source, to update the state vector and the covariance of uncertainty data. As one example, at time step k+1, the image data contributes a linearized cost term as:

$$C_z = \|H_{k+1}\tilde{x}_{k+1}' - \delta z_{k+1}\|_{R_{k+1}}^2$$

In the foregoing example, to simplify notation, the error state $\tilde{x}_{k-m:k+1}$ is denoted as $\tilde{x}_{k+1}'$, the square-root factor $L_{k-m:k+1}^\ominus$ is denoted as $L'_{k+1}{}^\ominus$, and the residual $r_{k-m:k+1}^\ominus$ is denoted as $r'_{k+1}{}^\ominus$. Further, in the foregoing example, $H_{k+1}$ is the linearized measurement Jacobian, $\delta z_{k+1}$ is the residual, and $R_{k+1}$ is the measurement noise covariance matrix, respectively.

Accordingly, after performing the update, the cost function is:

$$C_{k+1}^\oplus = C_{k+1}^\ominus + C_z = \left\|L'_{k+1}{}^{\ominus-1}\tilde{x}'_{k+1} - r'^\ominus_{k+1}\right\|_I^2 + \|H_{k+1}\tilde{x}'_{k+1} - \delta z_{k+1}\|_{R_{k+1}}^2 =$$

$$\left\|\begin{bmatrix} L'_{k+1}{}^{\ominus-1} \\ R_{k+1}^{-\frac{1}{2}} H_{k+1} \end{bmatrix} \tilde{x}'_{k+1} - \begin{bmatrix} r'^\ominus_{k+1} \\ R_{k+1}^{-\frac{1}{2}} \delta z_{k+1} \end{bmatrix}\right\|_I^2 =$$

$$\left\|\begin{bmatrix} I \\ R_{k+1}^{-\frac{1}{2}} H_{k+1} L'^\ominus_{k+1} \end{bmatrix} L'_{k+1}{}^{\ominus-1}\tilde{x}'_{k+1} - \begin{bmatrix} r'^\ominus_{k+1} \\ R_{k+1}^{-\frac{1}{2}} \delta z_{k+1} \end{bmatrix}\right\|_I^2$$

Estimator 22 may apply thin QR factorization as follows:

$$\begin{bmatrix} I \\ R_{k+1}^{-\frac{1}{2}} H_{k+1} L'^\ominus_{k+1} \end{bmatrix} = \overline{Q}\overline{L}$$

If $\overline{L}$ is lower-triangular, then the cost function (ignoring constants) is:

$$C_{k+1}^\oplus = \left\|\overline{Q}^T\begin{bmatrix} I \\ R_{k+1}^{-\frac{1}{2}} H_{k+1} L'^\ominus_{k+1} \end{bmatrix} L'_{k+1}{}^{\ominus-1}\tilde{x}'_{k+1} - \overline{Q}^T\begin{bmatrix} r'^\ominus_{k+1} \\ R_{k+1}^{-\frac{1}{2}} \delta z_{k+1} \end{bmatrix}\right\|_I^2 =$$

$$\left\|\overline{L}L'_{k+1}{}^{\ominus-1}\tilde{x}'_{k+1} - \overline{Q}^T\begin{bmatrix} r'^\ominus_{k+1} \\ R_{k+1}^{-\frac{1}{2}} \delta z_{k+1} \end{bmatrix}\right\|_I^2 = \left\|L'^{\oplus-1}_{k+1}\tilde{x}'_{k+1} - r'^\oplus_{k+1}\right\|_I^2$$

where $$L'^\oplus_{k+1} \triangleq L'^\ominus_{k+1}\overline{L}^{-1}, \quad r'^\oplus_{k+1} \triangleq \overline{Q}^T\begin{bmatrix} r'^\ominus_{k+1} \\ R_{k+1}^{-\frac{1}{2}} \delta z_{k+1} \end{bmatrix}$$

With respect to the foregoing equations, because $L'_{k+1}{}^\ominus$ and $\overline{L}$ are lower-triangular, $L'_{k+1}{}^\oplus$ is lower-triangular. Accordingly, the updated covariance factor for the uncertainty data is given as $L'_{k+1}{}^\oplus$. Estimator 22 may determine L'k+1$^\oplus$ by performing QR factorization (as described above) and solving for L'k+1$^\oplus$ using the equations in the preceding paragraph.

In some examples, estimator 22 obtains the updated residual r'k+1$^\oplus$ in place during the QR factorization process, rather than forming $\overline{Q}$ explicitly. Upon determining the updated factor $L'_{k+1}{}^\oplus$ and the residual $r'_{k+1}{}^\oplus$, estimator 22 may update the state estimates of state vector 17 by minimizing the cost function $C_{k+1}^\oplus$ described above, which gives:

$$\hat{x}_{k+1}^\oplus = \hat{x}_{k+1}^\ominus + L'_{k+1}{}^\oplus r'_{k+1}{}^\oplus$$

where $\hat{x}_{k+1}^\ominus$ and $\hat{x}_{k+1}^\oplus$ are the state estimates before and after estimator 22 performs the update, respectively.

In addition, estimator 22 computes updates for the set of prior constraints to be used in the next iteration (110) and marginalizes the oldest keyframe by absorbing the keyframe into the prior of the estimator (112). That this, estimator 22 discards the oldest keyframe from the sliding window and adds a new one to the image processing pipeline.

As one example of the marginalization process, estimator 22 marginalizes old states within filter 23 to maintain constant computational complexity. In one example, after performing the update process described above for time step k+1, estimator 22 marginalizes the $x^1$ component of state vector $x_{k-m:k+1} = [x_1^T \, x_2^T]^T$, wherein $x_1$ includes past poses or features. The techniques of the disclosure contemplate two approaches to marginalizing the old states: 1) an EFK-based derivation, and 2) a cost-function derivation. In accordance with the techniques of the disclosure, each of the two marginalization approaches perform a QR factorization to obtain a marginalized covariance factor $L_{k+1}' = R_2^T$. This factor, as well as the state estimate $\hat{x}_2^\oplus$, will serve as the prior information for the subsequent time step.

In one example of the marginalization process, with respect to the EFK-based derivation, estimator 22 drops corresponding portions of the state estimates and the covariance matrix of the uncertainty data for the marginalized states. For example, assuming that the updated factor L'k+1$^\oplus$ has the following structure (since the factor is lower-triangular):

$$L'^\oplus_{k+1} = \begin{bmatrix} L_{11} & 0 \\ L_{21} & L_{22} \end{bmatrix}$$

Accordingly, the corresponding covariance matrix for the uncertainty data is defined as follows:

$$P_{k+1}^\oplus = L'^\oplus_{k+1} L'^{\oplus T}_{k+1} = \begin{bmatrix} L_{11}L_{11}^T & L_{11}L_{21}^T \\ L_{21}L_{11}^T & L_{21}L_{21}^T + L_{22}L_{22}^T \end{bmatrix}$$

Therefore, after removing state $x_1$ from the state vector, the covariance matrix for the uncertainty data is the (2,2) block element of $P'_{k+1}{}^\oplus$, as defined by:

$$P'^\oplus_{k+1}(2,2) = L_{21}L_{21}^T + L_{22}L_{22}^T = [L_{21} \; L_{22}]\begin{bmatrix} L_{21}^T \\ L_{22}^T \end{bmatrix}$$

Estimator 22 may apply the following thin QR factorization:

$$\begin{bmatrix} L_{21}^T \\ L_{22}^T \end{bmatrix} = Q_2 R_2$$

where $R_2$ is upper-triangular, which results in:

$$P'_{k+1}{}^{\oplus}(2,2) = R_2^T R_2$$

Accordingly, after performing marginalization of the old state vector data, the lower-triangular covariance factor is obtained by performing the above QR factorization and is given by:

$$L_{k+1}' R_2^T$$

As another aspect of the marginalization process, with respect to the cost-function derivation, the updated error state may be defined as:

$$\begin{bmatrix} \tilde{x}_1^{\oplus} \\ \tilde{x}_2^{\oplus} \end{bmatrix} = \begin{bmatrix} x_1 \\ x_2 \end{bmatrix} - \begin{bmatrix} \hat{x}_1^{\oplus} \\ \hat{x}_2^{\oplus} \end{bmatrix}$$

such that the cost function becomes:

$$C_{k+1}^{\oplus} = \left\| L_{k+1}'^{\oplus^{-1}} \begin{bmatrix} \tilde{x}_1^{\oplus} \\ \tilde{x}_2^{\oplus} \end{bmatrix} \right\|_I^2$$

Accordingly, estimator 22 determines a square orthonormal matrix U, with $U^T U = U U^T = I$, such that $U^T L'k+1^{\oplus^{-1}}$ has a block upper-triangular structure. The techniques of the disclosure make use of the fact that the inverse of the updated factor $L'_{k+1}{}^{\oplus^{-1}}$ of matrix U may be represented as:

$$L_{k+1}'^{\oplus^{-1}} =$$

$$\begin{bmatrix} L_{11} & 0 \\ L_{21} & L_{22} \end{bmatrix}^{-1} = \begin{bmatrix} L_{11}^{-1} & 0 \\ -L_{22}^{-1} L_{21} L_{11}^{-1} & L_{22}^{-1} \end{bmatrix} = \begin{bmatrix} I & 0 \\ -L_{22}^{-1} L_{21} & I \end{bmatrix} \begin{bmatrix} L_{11}^{-1} & 0 \\ 0 & L_{22}^{-1} \end{bmatrix}$$

Defining $U' = [U_1' \ U_2']$, estimator 22 selects $U_1'$ to span the same column space of the first block column of $L'_{k+1}{}^{\oplus^{-1}}$ and further selects $U_z$ to span the left null space such that:

$$U_1' = \begin{bmatrix} I \\ -L_{22}^{-1} L_{21} \end{bmatrix}, \ U_2' = \begin{bmatrix} L_{21}^T \\ L_{22}^T \end{bmatrix}$$

Accordingly, $U_1'$ and $U_2'$ are orthogonal to one another (e.g., $U_1'^T U_2' = 0$) and the resulting $U^T L'_{k+1}{}^{\oplus^{-1}}$ is block upper-triangular.

Next, given U', estimator 22 selects block columns of U to be orthonormal bases of $U_1'$ and $U_2'$ as follows:

$$U_1' = \begin{bmatrix} I \\ -L_{22}^{-1} L_{21} \end{bmatrix} = Q_1 R_1 \Rightarrow Q_1 = \begin{bmatrix} I \\ -L_{22}^{-1} L_{21} \end{bmatrix} R_1^{-1}$$

-continued $$U_2' = \begin{bmatrix} L_{21}^T \\ L_{22}^T \end{bmatrix} = Q_2 R_2 \Rightarrow Q_2 = \begin{bmatrix} L_{21}^T \\ L_{22}^T \end{bmatrix} R_2^{-1}$$

Following the above, U is given as:

$$U = [Q_1 \ Q_2] = \begin{bmatrix} I & L_{21}^T \\ -L_{22}^{-1} L_{21} & L_{22}^T \end{bmatrix} \begin{bmatrix} R_1^{-1} & 0 \\ 0 & R_2^{-1} \end{bmatrix}$$

As described herein, matrix U is orthonormal because both $Q_1$ and $Q_2$ are orthonormal and orthogonal to one another. Further, $U^T L'_{k+1}{}^{\oplus^{-1}}$ is block upper-triangular such that:

$$U^T L_{k+1}'^{\oplus^{-1}} = \begin{bmatrix} R_1^{-T} & 0 \\ 0 & R_2^{-T} \end{bmatrix} \begin{bmatrix} I & -L_{21}^T L_{22}^{-T} \\ L_{21} & L_{22} \end{bmatrix} \begin{bmatrix} I & 0 \\ -L_{22}^{-1} L_{21} & I \end{bmatrix}$$

$$\begin{bmatrix} L_{11}^{-1} & 0 \\ 0 & L_{22}^{-1} \end{bmatrix} = \begin{bmatrix} R_1^{-T} & 0 \\ 0 & R_2^{-T} \end{bmatrix} \begin{bmatrix} I + L_{21}^T L_{22}^{-T} L_{22}^{-1} L_{21} & -L_{21}^T L_{22}^{-T} \\ 0 & L_{22} \end{bmatrix}$$

$$\begin{bmatrix} L_{11}^{-1} & 0 \\ 0 & L_{22}^{-1} \end{bmatrix} = \begin{bmatrix} R_1 L_{11}^{-1} & R_1^{-T} L_{21}^T L_{22}^{-T} L_{22}^{-1} \\ 0 & R_2^{-T} \end{bmatrix}$$

Given the above orthonormal matrix U, the cost function may be written as:

$$C_{k+1}^{\oplus} = \left\| L_{k+1}'^{\oplus^{-1}} \begin{bmatrix} \tilde{x}_1^{\oplus} \\ \tilde{x}_2^{\oplus} \end{bmatrix} \right\|_I^2 =$$

$$\left\| U^T L_{k+1}'^{\oplus^{-1}} \begin{bmatrix} \tilde{x}_1^{\oplus} \\ \tilde{x}_2^{\oplus} \end{bmatrix} \right\|_I^2 = \left\| \begin{bmatrix} R_1 L_{11}^{-1} & R_1^{-T} L_{21}^T L_{22}^{-T} L_{22}^{-1} \\ 0 & R_2^{-T} \end{bmatrix} \begin{bmatrix} \tilde{x}_1^{\oplus} \\ \tilde{x}_2^{\oplus} \end{bmatrix} \right\|_I^2 =$$

$$\| R_1 L_{11}^{-1} \tilde{x}_1^{\oplus} - R_1^{-T} L_{21}^T L_{22}^{-T} L_{22}^{-1} \tilde{x}_2^{\oplus} \|_I^2 + \| R_2^{-T} \tilde{x}_2^{\oplus} \|_I^2$$

Estimator 22 may perform marginalization by removing $\tilde{x}_1^{\oplus}$ from the foregoing cost function. In other words, estimator 22 may minimize $\tilde{x}_1^{\oplus}$ with respect to the cost function as follows:

$$\min_{\tilde{x}_1^{\oplus}} C_{k+1}^{\oplus} = \min_{\tilde{x}_1^{\oplus}} \| R_1 L_{11}^{-1} \tilde{x}_1^{\oplus} - R_1^{-T} L_{21}^T L_{22}^{-T} L_{22}^{-1} \tilde{x}_2^{\oplus} \|_I^2 + \| R_2^{-T} \tilde{x}_2^{\oplus} \|_I^2 = \| R_2^{-T} \tilde{x}_2^{\oplus} \|_I^2$$

Because $R_1 L_{11}^{-1}$ is invertible, for any $\tilde{x}_2^{\oplus}$, there exists an $\tilde{x}_1^{\oplus}$ that makes the first cost term in the preceding paragraph zero. Accordingly, the simplified cost function in the preceding paragraph, which involves only $\tilde{x}_2^{\oplus}$, contains sufficient information for estimating $\tilde{x}_2^{\oplus}$ after marginalization.

Based on the computed state estimates, estimator 22 may further output a navigation user interface, e.g., a map, e.g., a 2D or 3D map, of the environment overlaid with the position and/or orientation of the frame of reference (114). The map may, for example, construct the user interface to include position and orientation information for the VINS along the trajectory relative to position information for any landmarks observed by the VINS. The user interface may be displayed, stored, used for subsequent navigation and the like.

Figure 4:
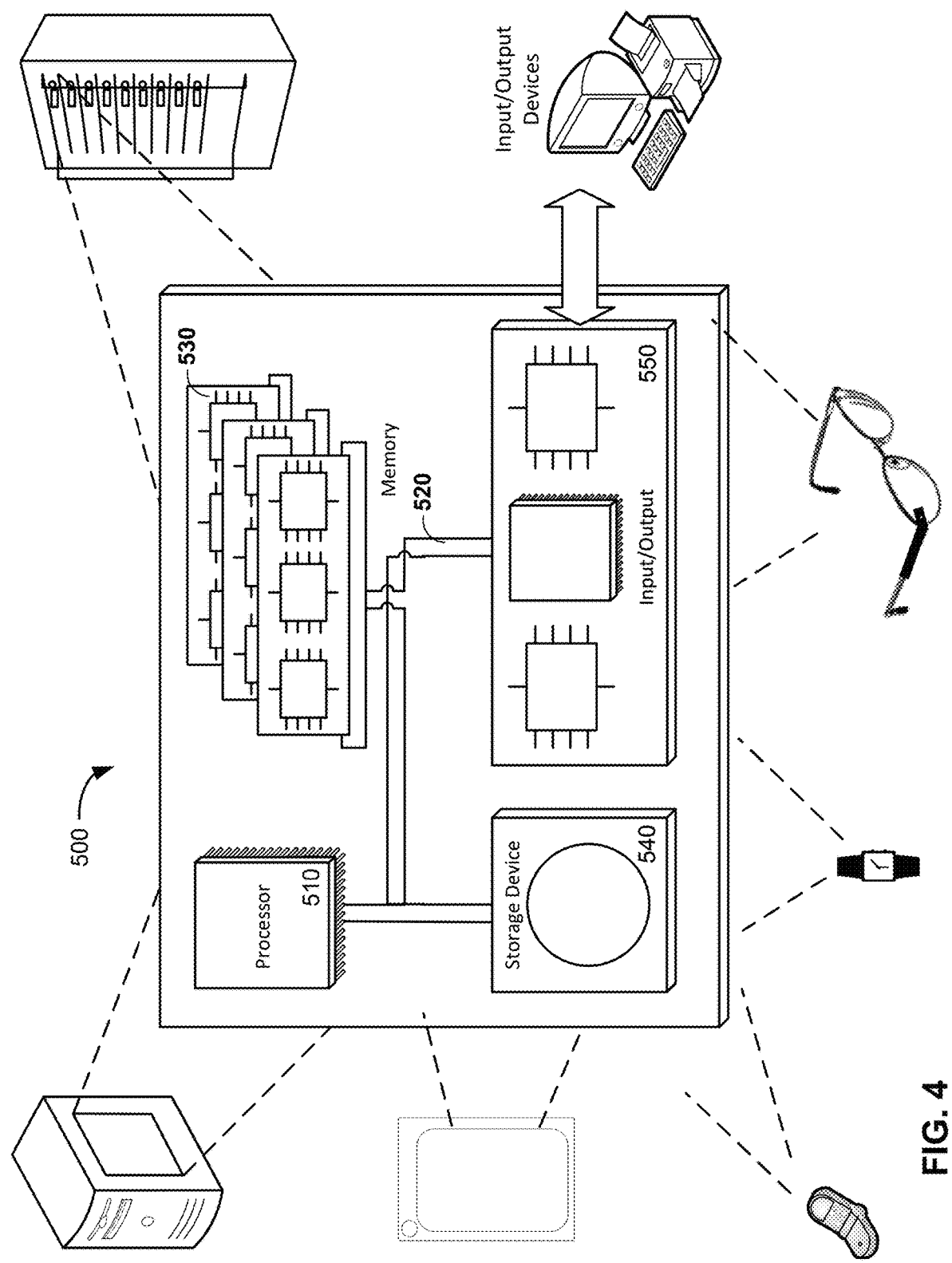
FIG. 4 is an illustration depicting a detailed example of various devices that may be configured to implement some embodiments in accordance with the current disclosure.

FIG. 4 is an illustration depicting a detailed example of various devices that may be configured to implement some embodiments in accordance with the current disclosure. For example, device 500 may be a robot, mobile sensing platform, a mobile phone, a wearable device such as a smartphone or smart watch, a workstation, a computing center, a cluster of servers or other example embodiments of a computing environment, centrally located or distributed, capable of executing the techniques described herein. Any or all of the devices may, for example, implement portions of the techniques described herein for vision-aided inertial navigation systems.

In this example, a computer 500 includes a hardware-based processor 510 that may be implemented within VINS 10 or any device to execute program instructions or software, causing the computer to perform various methods or tasks, such as performing the techniques described herein. Processor 510 may be a general-purpose processor, a digital signal processor (DSP), a core processor within an Application Specific Integrated Circuit (ASIC) and the like. Processor 510 is coupled via bus 520 to a memory 530, which is used to store information such as program instructions and other data while the computer is in operation. A storage device 540, such as a hard disk drive, nonvolatile memory, or other non-transient storage device stores information such as program instructions, data files of the multidimensional data and the reduced data set, and other information. As another example, computer 500 may provide an operating environment for execution of one or more virtual machines that, in turn, provide an execution environment for software for implementing the techniques described herein.

The computer also includes various input-output elements 550, including parallel or serial ports, USB, Firewire or IEEE 1394, Ethernet, and other such ports to connect the computer to external device such a printer, video camera, surveillance equipment or the like. Other input-output elements include wireless communication interfaces such as Bluetooth, Wi-Fi, and cellular data networks.

The following examples illustrate one or more of the techniques described herein:

Example 1. A VINS comprising: at least one image source to produce image data for a plurality of poses of a frame of reference along a trajectory within an environment over a period of time, wherein the image data includes features that were each observed within the environment at poses of the frame of reference along the trajectory, wherein one or more of the features were each observed at multiple ones of the poses of the frame of reference along the trajectory; a motion sensor configured to provide motion data of the frame of reference in the environment for the period of time; and a hardware-based processor communicatively coupled to the image source and communicatively coupled to the motion sensor, the processor configured to compute estimates for at least a position and orientation of the frame of reference for each of the plurality of poses of the frame of reference along the trajectory, wherein the processor executes an Extended Kalman Filter (EKF)-based estimator configured to: for one or more of the features observed from multiple poses along the trajectory, compute one or more constraints that geometrically relate the multiple poses from which the respective feature was observed; determine, in accordance with the motion data and the one or more computed constraints, state estimates for the position and orientation of the frame of reference for each of the plurality of poses along the trajectory; and determine uncertainty data for the state estimates, wherein the EKF-based estimator maintains the uncertainty data to comprise a square root factor of a covariance matrix.

Example 2. The VINS of example 1, wherein, to determine the uncertainty data for the state estimates, the EKF-based estimator is further configured to determine a Cholesky factor of the covariance matrix as the uncertainty data.

Example 3. The VINS of example 1, wherein, when executing the EFK-based estimator, the processor: maintains a state vector state information for the positions and orientations of the VINS and for positions with the environment for features observed within the environment; and excludes, from the state vector, state information representing estimates for positions within the environment for the features that were each observed from the multiple poses and for which the one or more constraints were computed.

Example 4. The VINS of example 1, wherein the covariance matrix, from which the square root factor is determined, excludes the features that were each observed from the multiple poses and for which the one or more constraints were computed.

Example 5. The VINS of example 1, wherein, when executing the EFK-based estimator, the processor: determines, from the image data, feature measurements corresponding to the features observed from the poses along the trajectory; groups the feature measurements according to the features observed within the image data; and for the one or more of the features observed from multiple poses along the trajectory, computes based on the respective group of feature measurements for the feature, the one or more constraints that geometrically relate the multiple poses from which the respective feature was observed.

Example 6. The VINS of example 1, wherein the image source includes a camera, and wherein the motion sensor includes an inertial measurement unit (IMU).

Example 7. The VINS of example 1, wherein the vision-aided inertial navigation system comprises one of a robot, a vehicle, a tablet, a mobile device or a wearable computing device.

Example 8. The VINS of example 1 further including at least one of a transmitter or a display for outputting a navigation user interface based on the computed state estimates.

Example 9. A method comprising: receiving, with a processor of a VINS and from at least one image source of the VINS, image data for a plurality of poses of a frame of reference along a trajectory within an environment over a period of time, wherein the image data includes features that were each observed within the environment at poses of the frame of reference along the trajectory, and wherein one or more of the features were each observed at multiple ones of the poses of the frame of reference along the trajectory; receiving, with the processor and from a motion sensor communicatively coupled to the processor, motion data of the frame of reference in the environment for the period of time; computing, with the processor, state estimates for at least a position and orientation of the frame of reference for each of the plurality of poses of the frame of reference along the trajectory by executing an Extended Kalman Filter (EKF)-based estimator, wherein computing the state estimates comprises: for one or more of the features observed from multiple poses along the trajectory, computing one or more constraints that geometrically relate the multiple poses from which the respective feature was observed; determining, in accordance with the motion data and the one or more computed constraints, state estimates for the position and orientation of the frame of reference for each of the plurality of poses along the trajectory; and determining uncertainty data for the state estimates, wherein the uncertainty data comprises a square root factor of a covariance matrix.

Example 10. The method of example 9, wherein determining the uncertainty data for the state estimates comprises determining a Cholesky factor of the covariance matrix as the uncertainty data.

Example 11. The method of example 9, wherein executing the EFK-based estimator further comprises: maintaining a state vector state information for the positions and orientations of the VINS and for positions with the environment for features observed within the environment; and excluding, from the state vector, state information representing estimates for positions within the environment for the features that were each observed from the multiple poses and for which the one or more constraints were computed.

Example 12. The method of example 9, further comprising excluding, from the covariance matrix from which the square root factor is determined, the features that were each observed from the multiple poses and for which the one or more constraints were computed.

Example 13. The method of example 9, wherein executing the EFK-based estimator further comprises: determining, from the image data, feature measurements corresponding to the features observed from the poses along the trajectory; grouping the feature measurements according to the features observed within the image data; and for the one or more of the features observed from multiple poses along the trajectory, computing based on the respective group of feature measurements for the feature, the one or more constraints that geometrically relate the multiple poses from which the respective feature was observed.

Example 14. The method of example 9, wherein the image source includes a camera, and wherein the motion sensor includes an inertial measurement unit (IMU).

Example 15. The method of example 9, wherein the VINS comprises one of a robot, a vehicle, a tablet, a mobile device or a wearable computing device.

Example 16. The method of example 9, further comprising outputting, by at least one of a transmitter or a display, a navigation user interface based on the computed state estimates.

Example 17. A non-transitory computer-readable medium comprising instructions that, when executed, cause a processor of a VINS to: receive, from at least one image source of the VINS, image data for a plurality of poses of a frame of reference along a trajectory within an environment over a period of time, wherein the image data includes features that were each observed within the environment at poses of the frame of reference along the trajectory, and wherein one or more of the features were each observed at multiple ones of the poses of the frame of reference along the trajectory; receive, from a motion sensor communicatively coupled to the processor, motion data of the frame of reference in the environment for the period of time; compute, state estimates for at least a position and orientation of the frame of reference for each of the plurality of poses of the frame of reference along the trajectory by executing an Extended Kalman Filter (EKF)-based estimator, wherein, to compute the state estimates, the processor is further configured to: for one or more of the features observed from multiple poses along the trajectory, compute one or more constraints that geometrically relate the multiple poses from which the respective feature was observed; determine, in accordance with the motion data and the one or more computed constraints, state estimates for the position and orientation of the frame of reference for each of the plurality of poses along the trajectory; and determine uncertainty data for the state estimates, wherein the uncertainty data comprises a square root factor of a covariance matrix.

Example 18. The computer-readable medium of example 17, wherein, to determine the uncertainty data for the state estimates, the instructions are further configured to cause the processor to determine a Cholesky factor of the covariance matrix as the uncertainty data.

Example 19. The computer-readable medium of example 17, wherein, to execute the EFK-based estimator, the instructions are further configured to cause the processor to: maintain a state vector state information for the positions and orientations of the VINS and for positions with the environment for features observed within the environment; and exclude, from the state vector, state information representing estimates for positions within the environment for the features that were each observed from the multiple poses and for which the one or more constraints were computed.

Example 20. The computer-readable medium of example 17, wherein the instructions are further configured to cause the processor to exclude, from the covariance matrix from which the square root factor is determined, the features that were each observed from the multiple poses and for which the one or more constraints were computed.

The computer itself may be a traditional personal computer, a rack-mount or business computer or server, or any other type of computerized system. The computer in a further example may include fewer than all elements listed above, such as a thin client or mobile device having only some of the shown elements. In another example, the computer is distributed among multiple computer systems, such as a distributed server that has many computers working together to provide various functions.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively, or additionally, if implemented in software or firmware, the techniques may be realized at least in part by a computer readable data storage medium comprising instructions that, when executed, cause one or more processors to perform one or more of the methods described above. For example, the computer-readable data storage medium or device may store such instructions for execution by a processor. Any combination of one or more computer-readable medium(s) may be utilized.

A computer-readable storage medium (device) may form part of a computer program product, which may include packaging materials. A computer-readable storage medium (device) may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

The invention claimed is:

1. A method for generating a user interface, comprising:
receiving, by processing circuitry and from at least one image source communicatively coupled to the processing circuitry, image data for a plurality of poses of a frame of reference along a trajectory within an environment over a period of time, wherein the image data includes features that were each observed within the environment at poses of the frame of reference along the trajectory, and wherein one or more of the features were each observed at multiple ones of the poses of the frame of reference along the trajectory;
receiving, by the processing circuitry and from a motion sensor communicatively coupled to the processing circuitry, motion data of the frame of reference in the environment for the period of time; and
computing, by the processing circuitry, state estimates for at least a position and orientation of the frame of reference for each of the plurality of poses of the frame of reference along the trajectory by executing an Extended Kalman Filter (EKF)-based estimator,
wherein computing the state estimates comprises:
for one or more of the features observed from multiple poses along the trajectory, computing, by the EKF-based estimator executed by the processing circuitry, one or more constraints that geometrically relate the multiple poses from which the corresponding feature was observed;
determining, by the EKF-based estimator executed by the processing circuitry and in accordance with the motion data and the one or more computed constraints, state estimates for the position and orientation of the frame of reference for each of the plurality of poses along the trajectory; and
determining, by the EKF-based estimator executed by the processing circuitry, uncertainty data for the state estimates, wherein the uncertainty data comprises a square root factor of a covariance matrix; and
outputting, by at least one of a transmitter or a display, a user interface mapping the at least a position and orientation of the frame of reference to the environment based on the state estimates.

2. The method of claim 1, wherein determining the uncertainty data for the state estimates comprises determining a Cholesky factor of the covariance matrix.

3. The method of claim 1,
wherein executing the EFK-based estimator further comprises:
maintaining a state vector of state information for the positions and orientations of the VINS and for positions with the environment for features observed within the environment; and
excluding, from the state vector, state information representing estimates for positions within the environment for the features that were each observed from the multiple poses and for which the one or more constraints were computed.

4. The method of claim 1, further comprising excluding, from the covariance matrix from which the square root factor is determined, the features that were each observed from the multiple poses and for which the one or more constraints were computed.

5. The method of claim 1, wherein executing the EFK-based estimator further comprises:
determining, from the image data, feature measurements corresponding to the features observed from the poses along the trajectory;
grouping the feature measurements according to the features observed within the image data; and
for the one or more of the features observed from multiple poses along the trajectory, computing, based on the corresponding group of feature measurements for the feature, the one or more constraints that geometrically relate the multiple poses from which the feature was observed.

6. The method of claim 1, wherein the user interface is targeted towards navigation.

7. The method of claim 1, wherein determining the uncertainty data for the state estimates comprises determining a lower-triangular square-root factor of the covariance matrix.

8. The method of claim 1, further comprising outputting, based on the computed state estimates for the at least a position and orientation of the frame of reference for each of the plurality of poses of the frame of reference along the trajectory, a map of the environment.

9. The method of claim 1, further comprising outputting, based on the computed state estimates for the at least a position and orientation of the frame of reference for each of the plurality of poses of the frame of reference along the trajectory, program instructions for navigating the environment.

10. The method of claim 1, further comprising providing, by the processing circuitry and based on the computed state estimates for the at least a position and orientation of the frame of reference for each of the plurality of poses of the frame of reference along the trajectory, an output to a display device.

11. A vision-aided inertial navigation system (VINS) for generating a user interface, comprising:
at least one image source configured to generate image data for a plurality of poses of a frame of reference along a trajectory within an environment over a period of time, wherein the image data includes features that were each observed within the environment at poses of the frame of reference along the trajectory, and wherein one or more of the features were each observed at multiple ones of the poses of the frame of reference along the trajectory;
a motion sensor configured to generate motion data of the frame of reference in the environment for the period of time; and a processor communicatively coupled to the at least one image source and the motion sensor, the processor configured to:
receive, from the at least one image source, the image data for the plurality of poses of the frame of reference along the trajectory within the environment over the period of time;
receive, from the motion sensor, the motion data of the frame of reference in the environment for the period of time; and
compute state estimates for at least a position and orientation of the frame of reference for each of the plurality of poses of the frame of reference along the trajectory by executing an Extended Kalman Filter (EKF)-based estimator,
wherein, to compute the state estimates, the EKF-based estimator is configured to:
for one or more of the features observed from multiple poses along the trajectory, compute one or more constraints that geometrically relate the multiple poses from which the corresponding feature was observed;
determine, in accordance with the motion data and the one or more computed constraints, state estimates for the position and orientation of the frame of reference for each of the plurality of poses along the trajectory; and
determine uncertainty data for the state estimates, wherein the uncertainty data comprises a square root factor of a covariance matrix; and
output, by at least one of a transmitter or a display, a user interface mapping the at least a position and orientation of the frame of reference to the environment based on the state estimates.

12. The VINS of claim 11, wherein to determine the uncertainty data for the state estimates, the EFK-based estimator is further configured to determine a Cholesky factor of the covariance matrix.

13. The VINS of claim 11,
wherein the EFK-based estimator is further configured to:
maintain a state vector of state information for the positions and orientations of the VINS and for positions with the environment for features observed within the environment; and
exclude, from the state vector, state information representing estimates for positions within the environment for the features that were each observed from the multiple poses and for which the one or more constraints were computed.

14. The VINS of claim 11, wherein the EFK-based estimator is further configured to exclude, from the covariance matrix from which the square root factor is determined, the features that were each observed from the multiple poses and for which the one or more constraints were computed.

15. The VINS of claim 11, wherein the EFK-based estimator is further configured to:
determine, from the image data, feature measurements corresponding to the features observed from the poses along the trajectory;
group the feature measurements according to the features observed within the image data; and for the one or more of the features observed from multiple poses along the trajectory, compute, based on the corresponding group of feature measurements for the feature, the one or more constraints that geometrically relate the multiple poses from which the feature was observed.

16. The VINS of claim 11, wherein the user interface is targeted towards navigation.

17. The VINS of claim 11, wherein, to determine the uncertainty data for the state estimates, the EKF-based estimator is configured to determine a lower-triangular square-root factor of the covariance matrix.

18. The VINS of claim 11, wherein the VINS comprises one of a robot, a vehicle, a tablet, a mobile device or a wearable computing device.

19. The VINS of claim 11, wherein the image source includes a camera.

20. The VINS of claim 11, wherein the motion sensor includes an inertial measurement unit (IMU).

21. A non-transitory, computer-readable medium for generating a user interface, comprising instructions, that, when executed, cause a processor of a vision-aided inertial navigation system (VINS) to:
receive, from at least one image source, image data for a plurality of poses of a frame of reference along a trajectory within an environment over a period of time, wherein the image data includes features that were each observed within the environment at poses of the frame of reference along the trajectory, and wherein one or more of the features were each observed at multiple ones of the poses of the frame of reference along the trajectory;
receiving, from a motion sensor, motion data of the frame of reference in the environment for the period of time; and
compute state estimates for at least a position and orientation of the frame of reference for each of the plurality of poses of the frame of reference along the trajectory by executing an Extended Kalman Filter (EKF)-based estimator,
wherein, to compute the state estimates, the EKF-based estimator is configured to:
for one or more of the features observed from multiple poses along the trajectory, compute one or more constraints that geometrically relate the multiple poses from which the corresponding feature was observed;
determine, in accordance with the motion data and the one or more computed constraints, state estimates for the position and orientation of the frame of reference for each of the plurality of poses along the trajectory; and
determine uncertainty data for the state estimates, wherein the uncertainty data comprises a square root factor of a covariance matrix; and
output, by at least one of a transmitter or a display, a user interface mapping the at least a position and orientation of the frame of reference to the environment based on the computed state estimates.

* * * * *

UNITED STATES PATENT AND TRADEMARK OFFICE
CERTIFICATE OF CORRECTION

| | |
|---|---|
| PATENT NO. | : 11,466,990 B2 |
| APPLICATION NO. | : 16/316718 |
| DATED | : October 11, 2022 |
| INVENTOR(S) | : Stergios I. Roumeliotis and Kejian J. Wu |

It is certified that error appears in the above-identified patent and that said Letters Patent is hereby corrected as shown below:

In the Claims

Column 20 (Claim 3, Line 5) replace "the VINS" with --a vision-aided inertial navigation system (VINS)--.

Signed and Sealed this
Twentieth Day of December, 2022

Katherine Kelly Vidal
*Director of the United States Patent and Trademark Office*